US010491273B2

(12) United States Patent
Schmid et al.

(10) Patent No.: US 10,491,273 B2
(45) **Date of Patent: *Nov. 26, 2019**

(54) DISTRIBUTED ANTENNA SYSTEM FOR MIMO SIGNALS

(71) Applicant: CommScope Technologies LLC, Hickory, NC (US)

(72) Inventors: Peter Schmid, Marxheim-Neuhausen (DE); Peter Gunzner, Monheim (DE); Harald Langer, Wemding (DE); Stefan Eisenwinter, Buchdorf (DE); Oliver Braz, Monheim (DE); Marianna Fabbri, Faenza (IT); Enrico Maria Fabbri, Forli (IT); Samuele Brighenti, Faenza (IT); Marco Parrucci, S. Michele (IT); Massimiliano Mini, Forli (IT); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,454

(22) Filed: May 21, 2018

(65) Prior Publication Data

US 2018/0269933 A1 Sep. 20, 2018

Related U.S. Application Data

(63) Continuation of application No. 15/464,014, filed on Mar. 20, 2017, now Pat. No. 9,979,443, which is a (Continued)

(51) Int. Cl.
*H04B 7/0413* (2017.01)
*H04B 1/00* (2006.01)

(52) U.S. Cl.
CPC ......... *H04B 7/0413* (2013.01); *H04B 1/0096* (2013.01)

(58) Field of Classification Search
CPC ............................ H04B 1/0096; H04B 7/0413

(Continued)

(56) References Cited

U.S. PATENT DOCUMENTS 3,665,316 A 5/1972 Jeffers
3,740,756 A 6/1973 Sosin (Continued)

FOREIGN PATENT DOCUMENTS

CN 1523371 A 8/2004
CN 1797971 A 7/2006

(Continued)

OTHER PUBLICATIONS

Korean Intellectual Property Office, "Notice of Last Non-Final Rejection from KR Application No. 10-2013-7011250 dated Nov. 21, 2018", from Foreign Counterpart to U.S. Appl. No. 13/796,978, filed Nov. 21, 2018, pp. 1-9, Published: KR.

(Continued)

*Primary Examiner* — Amritbir K Sandhu
(74) *Attorney, Agent, or Firm* — Fogg & Powers LLC

(57) ABSTRACT

A method includes: receiving MIMO channel signals at original MIMO frequency from signal source(s) at master unit of DAS, set(s) of the MIMO channel signals including first MIMO channel signal and second MIMO channel signal; generating local oscillator signal at master unit; frequency converting first MIMO channel signal(s) and second MIMO channel signal(s) from original MIMO frequency to different frequency different from first legacy service frequency band using local oscillator signal at master unit; combining first MIMO channel signal, second MIMO channel signal, and local oscillator signal into combined (Continued)

signal at master unit; transmitting combined signal across optical link to remote unit; processing first MIMO channel signal and/or second MIMO channel signal at remote unit; and frequency converting converted MIMO channel signal (s) from different frequency different from first legacy service frequency band back to original MIMO frequency for transmission over antenna(s).

18 Claims, 24 Drawing Sheets

Related U.S. Application Data continuation of application No. 14/987,025, filed on Jan. 4, 2016, now Pat. No. 9,602,176, which is a continuation of application No. 13/796,978, filed on Mar. 12, 2013, now Pat. No. 9,231,670, which is a continuation of application No. PCT/US2011/054281, filed on Sep. 30, 2011.

(60) Provisional application No. 61/388,973, filed on Oct. 1, 2010.

(58) Field of Classification Search
USPC .................................................. 398/115, 116
See application file for complete search history.

(56) References Cited

U.S. PATENT DOCUMENTS 3,778,716 A 12/1973 Stokes
3,898,566 A 8/1975 Switzer et al.
4,092,596 A 5/1978 Dickinson et al.
4,213,132 A 7/1980 Davidson
4,238,779 A 12/1980 Dickinson et al.
4,615,040 A 9/1986 Mojoli et al.
4,709,418 A 11/1987 Fox et al.
4,763,317 A 8/1988 Lehman et al.
4,827,270 A 5/1989 Udagawa et al.
4,849,811 A 7/1989 Kleinerman
4,949,340 A 8/1990 Smith et al.
5,025,485 A 6/1991 Csongor et al.
5,153,763 A 10/1992 Pidgeon
5,239,667 A 8/1993 Kanai
5,263,175 A 11/1993 Dejmek
5,428,817 A 6/1995 Yahagi
5,444,697 A 8/1995 Leung et al.
5,519,735 A 5/1996 Rice et al.
5,627,879 A 5/1997 Russell et al.
5,657,374 A 8/1997 Russell et al.
5,715,275 A 2/1998 Emi
5,719,867 A 2/1998 Borazjani
5,745,858 A 4/1998 Sato et al.
5,774,789 A 6/1998 Van Der Kaay et al.
5,854,986 A 12/1998 Dorren et al.
5,867,292 A 2/1999 Crimmins et al.
5,881,095 A 3/1999 Cadd
5,930,231 A 7/1999 Miller et al.
5,930,293 A 7/1999 Light et al.
5,969,837 A 10/1999 Farber et al.
6,064,665 A 5/2000 Leuck et al.
6,125,109 A 9/2000 Fuerter
6,215,777 B1 4/2001 Chen et al.
6,222,503 B1 4/2001 Gietema et al.
6,366,789 B1 4/2002 Hildebrand
6,405,341 B1 6/2002 Maru
6,418,558 B1 7/2002 Roberts et al.
6,486,907 B1 11/2002 Farber et al.
6,590,871 B1 7/2003 Adachi
6,594,496 B2 7/2003 Schwartz
6,704,545 B1 3/2004 Wala
6,715,349 B2 4/2004 Atkinson
6,801,767 B1 10/2004 Schwartz et al.
6,831,901 B2 12/2004 Millar
6,870,515 B2 3/2005 Kitchener et al.
6,906,681 B2 6/2005 Hoppenstein
6,925,578 B2 8/2005 Lam et al.
6,961,388 B2 11/2005 Ling et al.
6,963,552 B2 11/2005 Sabat, Jr. et al.
7,024,231 B2 4/2006 Cohen
7,043,270 B2 5/2006 Judd et al.
7,215,651 B2 5/2007 Millar
7,233,771 B2 6/2007 Proctor, Jr. et al.
7,260,153 B2 8/2007 Nissani (Nissensohn)
7,328,033 B2 2/2008 Rappaport et al.
7,339,897 B2 3/2008 Larsson et al.
7,346,040 B2 3/2008 Weinstein
7,391,815 B2 6/2008 Lakkis
7,395,040 B2 7/2008 Behzad
7,403,576 B2 7/2008 Lakkis
7,430,397 B2 9/2008 Suda et al.
7,440,436 B2 10/2008 Cheng et al.
7,443,708 B2 10/2008 Madan et al.
RE40,564 E 11/2008 Fischer et al.
7,446,630 B2 11/2008 Chan et al.
7,450,637 B2 11/2008 Lakkis
7,469,015 B2 12/2008 Le Nir et al.
7,483,483 B2 1/2009 Lakkis
7,483,504 B2 1/2009 Shapira et al.
7,555,261 B2 6/2009 O'Neill
7,587,001 B2 9/2009 Hazani et al.
7,603,141 B2 10/2009 Dravida
7,613,423 B2 11/2009 Ngo et al.
7,630,356 B2 12/2009 Zhang et al.
7,650,261 B2 1/2010 Takiishi et al.
7,653,083 B2 1/2010 Liu et al.
7,653,146 B2 1/2010 Kisovec et al.
7,653,148 B2 1/2010 Kisovec et al.
7,656,842 B2 2/2010 Thomas et al.
7,672,739 B2 3/2010 Ganesan et al.
7,710,327 B2 5/2010 Saban et al.
7,720,036 B2 5/2010 Sadri et al.
7,751,775 B2 7/2010 Baier et al.
7,760,699 B1 7/2010 Malik
7,761,050 B2 7/2010 Fitton et al.
7,787,823 B2 8/2010 George et al.
7,809,073 B2 10/2010 Liu
7,813,451 B2 10/2010 Binder et al.
7,817,603 B2 10/2010 Liu
7,822,148 B2 10/2010 Shapira et al.
7,840,190 B2 11/2010 Saban et al.
7,929,596 B2 4/2011 Lakkis
7,965,990 B2 6/2011 Luz et al.
8,010,116 B2 8/2011 Scheinert
8,023,826 B2 9/2011 Fasshauer et al.
8,055,300 B2 11/2011 Andersson et al.
8,111,959 B2 2/2012 Shapiro
8,121,535 B2 2/2012 Proctor, Jr. et al.
8,121,646 B2 2/2012 Oren et al.
8,126,396 B2 2/2012 Bennett
8,131,218 B2 3/2012 Kleider et al.
8,135,273 B2 3/2012 Sabat, Jr. et al.
8,156,535 B2 4/2012 Sage
8,159,954 B2 4/2012 Larsson et al.
8,160,121 B2 4/2012 Forenza et al.
8,170,081 B2 5/2012 Forenza et al.
8,175,459 B2 5/2012 Thelen et al.
8,175,649 B2 5/2012 Saban et al.
8,184,681 B2 5/2012 Binder et al.
8,195,224 B2 6/2012 Saban et al.
8,208,414 B2 6/2012 Singh et al.
8,208,963 B2 6/2012 Codreanu et al.
8,245,092 B2 8/2012 Kotecha et al.
8,248,993 B2 8/2012 Cai
8,289,910 B2 10/2012 Gabriel et al.
8,310,963 B2 11/2012 Singh
8,320,957 B2 11/2012 Saban et al.
8,325,693 B2 12/2012 Hazani et al.
8,325,759 B2 12/2012 Hazani et al.
8,331,425 B2 12/2012 Nicolas et al.
8,346,091 B2 1/2013 Kummetz et al.
8,351,531 B2 1/2013 Yu et al.

(56) References Cited

U.S. PATENT DOCUMENTS 8,396,368 B2 3/2013 Tarlazzi et al.
8,412,260 B2 4/2013 Rave
8,472,367 B2 6/2013 Larsson et al.
8,503,544 B2 8/2013 Chockalingam et al.
8,509,342 B2 8/2013 Dufresne et al.
8,509,708 B2 8/2013 Zhang et al.
8,514,915 B2 8/2013 Binder et al.
8,514,963 B2 8/2013 Matsumoto et al.
8,515,862 B2 8/2013 Zhang et al.
8,548,330 B2 10/2013 Berlin et al.
8,571,086 B2 10/2013 Forenza et al.
8,594,133 B2 11/2013 Shapira et al.
8,594,223 B2 11/2013 Ranson et al.
8,626,238 B2 1/2014 Stratford et al.
8,644,844 B2 2/2014 Shapira et al.
8,654,815 B1 2/2014 Forenza et al.
8,655,396 B2 2/2014 Malladi et al.
8,681,916 B2 3/2014 Braz et al.
8,681,917 B2 3/2014 McAllister et al.
8,711,760 B2 4/2014 Kasher
8,711,778 B2 4/2014 Murata
8,730,848 B2 5/2014 Schmid et al.
8,744,504 B2 6/2014 Faccin et al.
8,774,079 B2 7/2014 Proctor, Jr. et al.
8,798,209 B2 8/2014 Lee et al.
8,824,588 B2 9/2014 Emmanuel et al.
8,855,036 B2 10/2014 Sabat et al.
8,873,585 B2 10/2014 Oren et al.
8,897,215 B2 11/2014 Shapira et al.
8,913,963 B2 12/2014 Lundstrom et al.
8,958,789 B2 2/2015 Bauman et al.
8,976,887 B2 3/2015 Reingold
9,008,205 B1 4/2015 Al-Dhahir
9,014,237 B2 4/2015 Li et al.
9,014,256 B2 4/2015 Ranson et al.
9,019,929 B2 4/2015 Berlin et al.
9,026,036 B2 5/2015 Saban et al.
9,036,684 B2 5/2015 Hui et al.
9,054,767 B2 6/2015 Razaviyayn et al.
9,059,751 B2 6/2015 Nosratinia et al.
9,100,048 B2 8/2015 Carlach et al.
9,100,075 B2 8/2015 Lorca Hernando
9,106,315 B2 8/2015 Hanson et al.
9,155,055 B2* 10/2015 Phillips ............... H04W 52/146
9,160,437 B2 10/2015 Ajima et al.
9,160,643 B2 10/2015 Gao et al.
9,184,962 B2 11/2015 Tarlazzi et al.
9,203,496 B2 12/2015 Fakhrai et al.
9,231,670 B2* 1/2016 Schmid ................ H04B 1/0096
9,602,176 B2 3/2017 Schmid et al.
9,979,443 B2 5/2018 Schmid et al.
10,027,369 B2* 7/2018 Hanson .................... H04B 1/40
2003/0002604 A1 1/2003 Fifield et al.
2004/0100930 A1 5/2004 Shapira et al.
2004/0106435 A1 6/2004 Bauman et al.
2005/0143091 A1 6/2005 Shapira et al.
2005/0249245 A1 11/2005 Hazani et al.
2005/0266902 A1 12/2005 Khatri et al.
2005/0276320 A1* 12/2005 Tsubosaka ....... H04B 10/25753 375/220
2006/0063494 A1 3/2006 Zhang et al.
2006/0202890 A1 9/2006 Otto
2006/0233200 A1 10/2006 Fifield et al.
2007/0104165 A1 5/2007 Hanaoka et al.
2007/0177494 A1 8/2007 Tomizawa
2007/0259643 A1 11/2007 Wu
2007/0274253 A1 11/2007 Zhang et al.
2007/0274279 A1 11/2007 Wood et al.
2008/0056332 A1 3/2008 Lakkis
2008/0095259 A1 4/2008 Dyer et al.
2008/0107202 A1 5/2008 Lee et al.
2008/0114580 A1 5/2008 Chin et al.
2008/0129009 A1* 6/2008 Czysz .................... B62K 21/06 280/275
2008/0175175 A1 7/2008 Oren et al.
2008/0180190 A1 7/2008 Chan et al.
2008/0191941 A1 8/2008 Saban et al.
2008/0192855 A1* 8/2008 Shapira ................... G01S 3/023 375/267
2008/0198955 A1 8/2008 Oren et al.
2008/0200177 A1 8/2008 Wang et al.
2008/0232305 A1* 9/2008 Oren ...................... H04B 7/022 370/328
2008/0284647 A1 11/2008 Oren et al.
2009/0080547 A1 3/2009 Naka et al.
2009/0092201 A1 4/2009 Luo et al.
2009/0124214 A1 5/2009 Zhang et al.
2009/0135944 A1 5/2009 Dyer et al.
2009/0141691 A1 6/2009 Jain
2009/0180426 A1 7/2009 Sabat et al.
2009/0219976 A1 9/2009 Oren et al.
2009/0227203 A1 9/2009 Guerreri et al.
2009/0316608 A1* 12/2009 Singh .................. H04W 88/085 370/280
2009/0316609 A1 12/2009 Singh
2010/0029320 A1 2/2010 Malladi et al.
2010/0062707 A1 3/2010 Gou et al.
2010/0115358 A1 5/2010 Kotecha et al.
2010/0246516 A1 9/2010 Pelletier et al.
2010/0272202 A1 10/2010 Matsumoto et al.
2010/0278530 A1* 11/2010 Kummetz ........... H04W 88/085 398/41
2011/0002410 A1 1/2011 Forenza et al.
2011/0002411 A1 1/2011 Forenza et al.
2011/0003608 A1 1/2011 Forenza et al.
2011/0077044 A1 3/2011 Sampath et al.
2011/0135308 A1* 6/2011 Tarlazzi ............... H04B 7/0413 398/79
2011/0182217 A1 7/2011 Schmid et al.
2011/0201368 A1 8/2011 Faccin et al.
2011/0235622 A1 9/2011 Kasher
2011/0241425 A1* 10/2011 Hunter, Jr. .............. H04L 12/10 307/39
2011/0263215 A1 10/2011 Asplund et al.
2011/0268203 A1 11/2011 Chockalingam et al.
2011/0292863 A1 12/2011 Braz et al.
2011/0317679 A1 12/2011 Jain
2012/0027145 A1 2/2012 Uyehara et al.
2012/0120998 A1 5/2012 Fakhrai et al.
2012/0213254 A1 8/2012 Yokouchi et al.
2012/0230380 A1 9/2012 Keusgen et al.
2012/0257659 A1* 10/2012 Braz ......................... H04L 7/06 375/222
2012/0267659 A1 10/2012 Chou et al.
2012/0281622 A1 11/2012 Saban et al.
2012/0321314 A1 12/2012 Oren et al.
2012/0329523 A1 12/2012 Stewart et al.
2013/0028304 A1 1/2013 Murata
2013/0051404 A1 2/2013 Binder et al.
2013/0058281 A1 3/2013 Berlin et al.
2013/0077658 A1 3/2013 Hui et al.
2013/0078927 A1 3/2013 Razaviyayn et al.
2013/0114650 A1 5/2013 Li et al.
2013/0129009 A1 5/2013 Ranson et al.
2013/0136202 A1* 5/2013 Kummetz ............... H04L 25/05 375/267
2013/0159817 A1 6/2013 Carlach et al.
2013/0188753 A1* 7/2013 Tarlazzi ................. H04B 7/024 375/299
2013/0195467 A1* 8/2013 Schmid ................ H04B 1/0096 398/115
2013/0201916 A1* 8/2013 Kummetz ............ H04W 24/02 370/328
2013/0219009 A1* 8/2013 Bheemarajaiah ..... H04L 41/046 709/217
2013/0279417 A1 10/2013 Binder et al.
2013/0295980 A1 11/2013 Reuven et al.
2013/0329825 A1 12/2013 Oren et al.
2013/0343474 A1 12/2013 Nosratinia et al.
2014/0016583 A1 1/2014 Smith
2014/0056389 A1 2/2014 Lee et al.
2014/0064399 A1 3/2014 Oren et al.
2014/0072071 A1 3/2014 Berlin et al.

(56) References Cited

U.S. PATENT DOCUMENTS

| | | | | |
|---|---|---|---|---|
| 2014/0079077 | A1 | 3/2014 | Saban et al. | |
| 2014/0079112 | A1* | 3/2014 | Ranson | H04B 7/022 375/240 |
| 2014/0083673 | A1* | 3/2014 | Thuillard | F24D 19/1015 165/299 |
| 2014/0087742 | A1 | 3/2014 | Brower et al. | |
| 2014/0119735 | A1 | 5/2014 | Cune et al. | |
| 2014/0135038 | A1 | 5/2014 | Shapira et al. | |
| 2014/0153918 | A1 | 6/2014 | Hazani | |
| 2014/0153919 | A1 | 6/2014 | Casterline et al. | |
| 2014/0161164 | A1 | 6/2014 | Emmanuel et al. | |
| 2014/0180581 | A1 | 6/2014 | Berlin et al. | |
| 2014/0211875 | A1 | 7/2014 | Berlin et al. | |
| 2014/0247791 | A1 | 9/2014 | Seo et al. | |
| 2014/0269358 | A1 | 9/2014 | Gao et al. | |
| 2014/0269859 | A1* | 9/2014 | Hanson | H04B 1/40 375/219 |
| 2014/0269966 | A1 | 9/2014 | Faccin et al. | |
| 2014/0286463 | A1 | 9/2014 | Reingold | |
| 2014/0301496 | A1 | 10/2014 | Ko et al. | |
| 2014/0348260 | A1 | 11/2014 | Lorca Hernando | |
| 2015/0023444 | A1 | 1/2015 | Tarlazzi et al. | |
| 2015/0023453 | A1 | 1/2015 | Ajima et al. | |
| 2015/0031316 | A1 | 1/2015 | Berlin et al. | |
| 2015/0035705 | A1 | 2/2015 | Anolik et al. | |
| 2015/0038185 | A1 | 2/2015 | Saban et al. | |
| 2015/0093106 | A1 | 4/2015 | Hazani | |
| 2015/0110013 | A1 | 4/2015 | Zhang et al. | |
| 2015/0131632 | A1 | 5/2015 | Hazani et al. | |
| 2015/0139346 | A1 | 5/2015 | Ko et al. | |
| 2015/0188582 | A1 | 7/2015 | Kahrizi et al. | |
| 2015/0195055 | A1 | 7/2015 | Ben-Shlomo | |
| 2015/0207558 | A1 | 7/2015 | Braz et al. | |
| 2015/0215921 | A1 | 7/2015 | Zhang et al. | |
| 2015/0249965 | A1* | 9/2015 | Dussmann | H03G 3/3042 455/501 |
| 2015/0282069 | A1 | 10/2015 | Hobbs et al. | |
| 2015/0319699 | A1 | 11/2015 | Bar-David | |
| 2015/0349868 | A1 | 12/2015 | Sawai | |
| 2016/0065256 | A1 | 3/2016 | Yun et al. | |
| 2016/0164648 | A1 | 6/2016 | Moon et al. | |
| 2016/0164800 | A1 | 6/2016 | Eitan et al. | |
| 2016/0173308 | A1 | 6/2016 | Yoon et al. | |
| 2017/0012649 | A1* | 1/2017 | Kummetz | H04B 7/022 |
| 2017/0163452 | A1* | 6/2017 | Breiling | H04L 25/03159 |
| 2017/0195015 | A1 | 7/2017 | Schmid et al. | |

FOREIGN PATENT DOCUMENTS

| | | | |
|---|---|---|---|
| CN | 1964216 | A | 5/2007 |
| KR | 20060049193 | A | 5/2006 |
| WO | 9722186 | A1 | 6/1997 |
| WO | 9827748 | A2 | 6/1998 |
| WO | 9831133 | A2 | 7/1998 |
| WO | 9955012 | A2 | 10/1999 |
| WO | 0110156 | A1 | 2/2001 |
| WO | 0225506 | A1 | 3/2002 |
| WO | 2005048401 | A1 | 5/2005 |
| WO | 2007054945 | A2 | 5/2007 |
| WO | 2007133630 | A2 | 11/2007 |
| WO | 2008004955 | A2 | 1/2008 |
| WO | 2008027531 | A2 | 3/2008 |
| WO | 2008076432 | A1 | 6/2008 |
| WO | 2008088859 | A2 | 7/2008 |
| WO | 2008088862 | A1 | 7/2008 |
| WO | 2008097651 | A1 | 8/2008 |
| WO | 2008099383 | A2 | 8/2008 |
| WO | 2008099390 | A2 | 8/2008 |
| WO | 2008103374 | A2 | 8/2008 |
| WO | 2008103375 | A2 | 8/2008 |
| WO | 2009002938 | A2 | 12/2008 |
| WO | 2009053910 | A2 | 4/2009 |
| WO | 2009081376 | A2 | 7/2009 |
| WO | 2009138876 | A2 | 11/2009 |
| WO | 2009155602 | A1 | 12/2009 |
| WO | 2010013142 | A1 | 2/2010 |
| WO | 2010059103 | A1 | 5/2010 |
| WO | 2010060490 | A1 | 6/2010 |
| WO | 2010075865 | A1 | 7/2010 |
| WO | 2010089719 | A1 | 8/2010 |
| WO | 2011057750 | A1 | 5/2011 |
| WO | 2011071870 | A1 | 6/2011 |
| WO | 2011100219 | A1 | 8/2011 |
| WO | 2012044969 | A1 | 4/2012 |
| WO | 2012075137 | A1 | 6/2012 |

OTHER PUBLICATIONS

Cho, "Practical Scheme to Enable MIMO Communications in Distributed Antenna Systems for Efficient Indoor Coverage", Department of Wireless Communications Engineering, Sep. 2009, pp. 25-28, IEEE.

European Patent Office, "Communication pursuant to Article 94(3) from EP Application No. 11768255.9 dated May 26, 2017", from Foreign Counterpart to U.S. Appl. No. 13/796,978, filed May 26, 2017, pp. 1-5, Published: EP.

European Patent Office, "Communication under Rule 71(3) from EP Application No. 11768255.9 dated Apr. 12, 2018", from Foreign Counterpart to U.S. Appl. No. 13/796,978, filed Apr. 12, 2018, pp. 1-88, Published: EP.

International Searching Authority, "International Search Report and Written Opinion from PCT Application No. PCT/US2011/054281 dated Feb. 24, 2012", from Foreign Counterpart to U.S. Appl. No. 13/796,978, filed Feb. 24, 2012, pp. 1-13, Published: EP.

Korean Intellectual Property Office, "Notice of Non-Final Rejection from KR Application No. 10-2013-7011250 dated Jan. 10, 2018", from Foreign Counterpart to U.S. Appl. No. 13/796,978, filed Jan. 10, 2018, pp. 1-32, Published: KR.

State Intellectual Property Office, P.R. China, "First Office Action from CN Application No. 201180047543.3 dated Mar. 18, 2015", from Foreign Counterpart to U.S. Appl. No. 13/796,978, filed Mar. 18, 2015, pp. 1-29, Published: CN.

State Intellectual Property Office, P.R. China, "Second Office Action from CN Application No. 201180047543.3 dated Oct. 19, 2015", from Foreign Counterpart to U.S. Appl. No. 13/796,978, filed Oct. 19, 2015, pp. 1-5, Published: CN.

U.S. Patent and Trademark Office, "Notice of Allowance", U.S. Appl. No. 13/796,978, dated Aug. 19, 2015, pp. 1-15, Published: US.

U.S. Patent and Trademark Office, "Notice of Allowability", U.S. Appl. No. 15/464,014, dated Apr. 26, 2018, pp. 1-6, Published: US.

U.S. Patent and Trademark Office, "Notice of Allowance", U.S. Appl. No. 14/987,025, dated Nov. 22, 2016, pp. 1-21, Published: US.

U.S. Patent and Trademark Office, "Notice of Allowance", U.S. Appl. No. 14/987,025, dated Jun. 29, 2016, pp. 1-14, Published: US.

U.S. Patent and Trademark Office, "Notice of Allowance", U.S. Appl. No. 15/464,014, dated Oct. 2, 2017, pp. 1-64, Published: US.

Tarlazzi et al., "Characterization of an Interleaved F-DAS MIMO Indoor Propagation Channel", "Nov. 8-9, 2010, Loughborough UK", pp. 505-508.

U.S. Patent and Trademark Office, "Office Action", U.S. Appl. No. 13/796,978, dated Jan. 15, 2015, pp. 1-53, Published: US.

U.S. Patent and Trademark Office, "Office Action", U.S. Appl. No. 14/987,025, dated Feb. 23, 2016, pp. 1-67, Published: US.

U.S. Patent and Trademark Office, "Office Action", U.S. Appl. No. 15/464,014, dated May 31, 2017, pp. 1-57, Published: US.

European Patent Office, "Invitation pursuant to Rule 63(1) from EP Application No. 18204606.0 dated Feb. 5, 2019", from Foreign Counterpart to U.S. Appl. No. 13/796,978, filed Feb. 5, 2019, pp. 1-3, Published: EP.

European Patent Office, "Extended European Search Report from EP Application No. 18204606.0 dated Jun. 3, 2019", from Foreign Counterpart to U.S. Appl. No. 13/796,978, pp. 1-12, Published: EP.

Korean Intellectual Property Office, "Notice of Final Rejection from KR Application No. 10-2013-7011250 dated Aug. 27, 2019", from

(56) References Cited

OTHER PUBLICATIONS

Foreign Counterpart to U.S. Appl. No. 13/796,978, pp. 1-5, Published: KR.

* cited by examiner

| | Gain DL | | Gain UL | |
|---|---|---|---|---|
| | ICP3 optimized | NF optimized | ICP3 optimized | NF optimized |
| 700 MHz | 36 dB | 36 dB | 36 dB | 43 dB |
| 700 MHz MIMO | 36 dB | 36 dB | 36 dB | 43 dB |
| 850 MHz | 36 dB | 36 dB | 36 dB | 43 dB |

| | Gain DL | | Gain UL | |
|---|---|---|---|---|
| | ICP3 optimized | NF optimized | ICP3 optimized | NF optimized |
| 700 MHz | 36 dB | 36 dB | 36 dB | 43 dB |
| 700 MHz MIMO | 36 dB | 36 dB | 36 dB | 43 dB |

DISTRIBUTED ANTENNA SYSTEM FOR MIMO SIGNALS

CROSS-REFERENCE TO RELATED APPLICATIONS

This Application is a Continuation Application of U.S. application Ser. No. 15/464,014, filed Mar. 20, 2017, entitled "DISTRIBUTED ANTENNA SYSTEM FOR MIMO SIGNALS", which Application is a Continuation Application of U.S. application Ser. No. 14/987,025, filed Jan. 4, 2016, entitled "DISTRIBUTED ANTENNA SYSTEM FOR MIMO SIGNALS", which Application is a Continuation Application of U.S. application Ser. No. 13/796,978, filed Mar. 12, 2013, entitled "DISTRIBUTED ANTENNA SYSTEM FOR MIMO SIGNALS", which Application is a Continuation Application of International PCT Application No. PCT/US2011/054281, filed Sep. 30, 2011, entitled "DISTRIBUTED ANTENNA SYSTEM FOR MIMO SIGNALS", which claims priority to and the filing benefit of U.S. Provisional Patent Application Ser. No. 61/388,973 filed on Oct. 1, 2010, entitled "DISTRIBUTED ANTENNA SYSTEM FOR MIMO SIGNALS", which applications are all incorporated by reference herein in their entireties.

FIELD OF THE INVENTION

Embodiments of the invention are directed to wireless communication systems, and specifically directed to distributed antenna systems for wireless MIMO communications.

BACKGROUND OF THE INVENTION

A contemporary wireless communication system for repeating wireless signals, such as distributed antenna system 10, is shown in FIG. 1, and includes a number of remote units 12 distributed to provide coverage within a service area of the system 10. In particular, each remote antenna unit 12 typically includes an antenna 14 and suitable electronics. Each remote unit is coupled to a master unit 16 with a suitable media, such as a coaxial cable or optical fiber. Each master unit 16 is, in turn, coupled to an RF combination network 18 that combines the signals from one or more (1-N) base transceiver stations ("BTS," or more simply, "base station") 20 (hereinafter, "BTS" 20). As illustrated in FIG. 1, the system 10 may include a plurality of master units 16 and may couple to a plurality of BTSs 20, each master unit 16 configured to provide a combination of the signals from the BTSs 20 to the various remote units 12. The link 21 between the BTSs 20 and the RF combination network 18 and various master units 16 may be a wired or wireless link.

In FIG. 1, each remote unit 12 broadcasts a wireless signal 24 that, in turn, is transceived with a wireless device 26 that may be a mobile device, such as a telephone device or a computing device. In particular, and as discussed above, the wireless signal 24 from each remote unit 12 may be a combination of signals from the BTSs 20. Thus, the wireless device 26 may communicate with the system 10 through any of the wireless signals 24 from the remote units 12. Specific embodiments of the system 10 illustrated in FIG. 1 may include ION-B systems and ION-M systems, both of which are distributed by Andrew LLC, a division of CommScope, Inc., of Hickory, N.C.

To improve wireless communications, such as communications from a base station to mobile devices, Multiple-Input/Multiple-Output ("MIMO") technology might be utilized to provide advanced solutions for performance enhancement and broadband wireless communication systems. Substantial improvements may be realized utilizing MIMO techniques with respect to the traditional SISO systems. MIMO systems have capabilities that allow them to fully exploit the multi-path richness of a wireless channel. This is in contrast with traditional techniques that try to counteract multi-path effects rather than embrace them. MIMO systems generally rely upon multi-element antennas at both of the ends of the communication links, such as in the base station and also in the wireless device. In addition to desirable beam-forming and diversity characteristics, MIMO systems also may provide spatial multiplexing gain, which allows multi data streams to be transmitted over spatially-independent parallel sub-channels. This may lead to a significant increase in the system capacity without extending the bandwidth requirements. Generally, a SISO system, such as that illustrated in FIG. 1, cannot increase spectral efficiency by taking advantage of spatial MIMO technology.

For example, the wireless device 26 of FIG. 1 receives one signal communication signal only, though it may be in the range of a plurality of remote units 12. The wireless signals 24 from each remote unit are typically at the same frequency and carry the same data, and communication between a plurality of remote units 12 and the wireless device 26 simultaneously may result in signal degradation and collisions. In a best case scenario, the multipath nature of the communication channel can be turned into an advantage by sophisticated equalizer algorithms. However, data bandwidth from the wireless device 26 is constricted to the speed of reception and processing of data from one remote unit 12.

It is therefore, desirable to take advantage of spatial MIMO signals within a distributed antenna system.

SUMMARY OF THE INVENTION

Embodiments of the invention provide a distributed antenna system ("DAS") that is configured to operate in a multiple-input and multiple-output ("MIMO") mode of operation. Alternative embodiments of the invention provide a DAS that normally operates in a single-input and single-output ("SISO") mode of operation but that has been converted to operate in a MIMO mode of operation with the addition of specified components.

BRIEF DESCRIPTION OF THE DRAWINGS

FIG. 5A is a diagrammatic illustration of a downlink portion of a conversion module in the master unit of the MIMO DAS of FIG. 2A, 3A, or 4A, while

FIG. 5C is a diagrammatic illustration of a downlink portion of a conversion module in the remote unit and/or extension unit of the MIMO DAS of FIG. 2A, 3A, or 4A, while

It should be understood that the appended drawings are not necessarily to scale, presenting a somewhat simplified representation of various preferred features illustrative of the basic principles of embodiments of the invention. The specific design features of the system and/or sequence of operations as disclosed herein, including, for example, specific dimensions, orientations, locations, and shapes of various illustrated components, will be determined in part by the particular intended application and use environment. Certain features of the illustrated embodiments may have been enlarged, distorted or otherwise rendered differently relative to others to facilitate visualization and clear understanding.

DETAILED DESCRIPTION OF THE INVENTION

Figure 1:
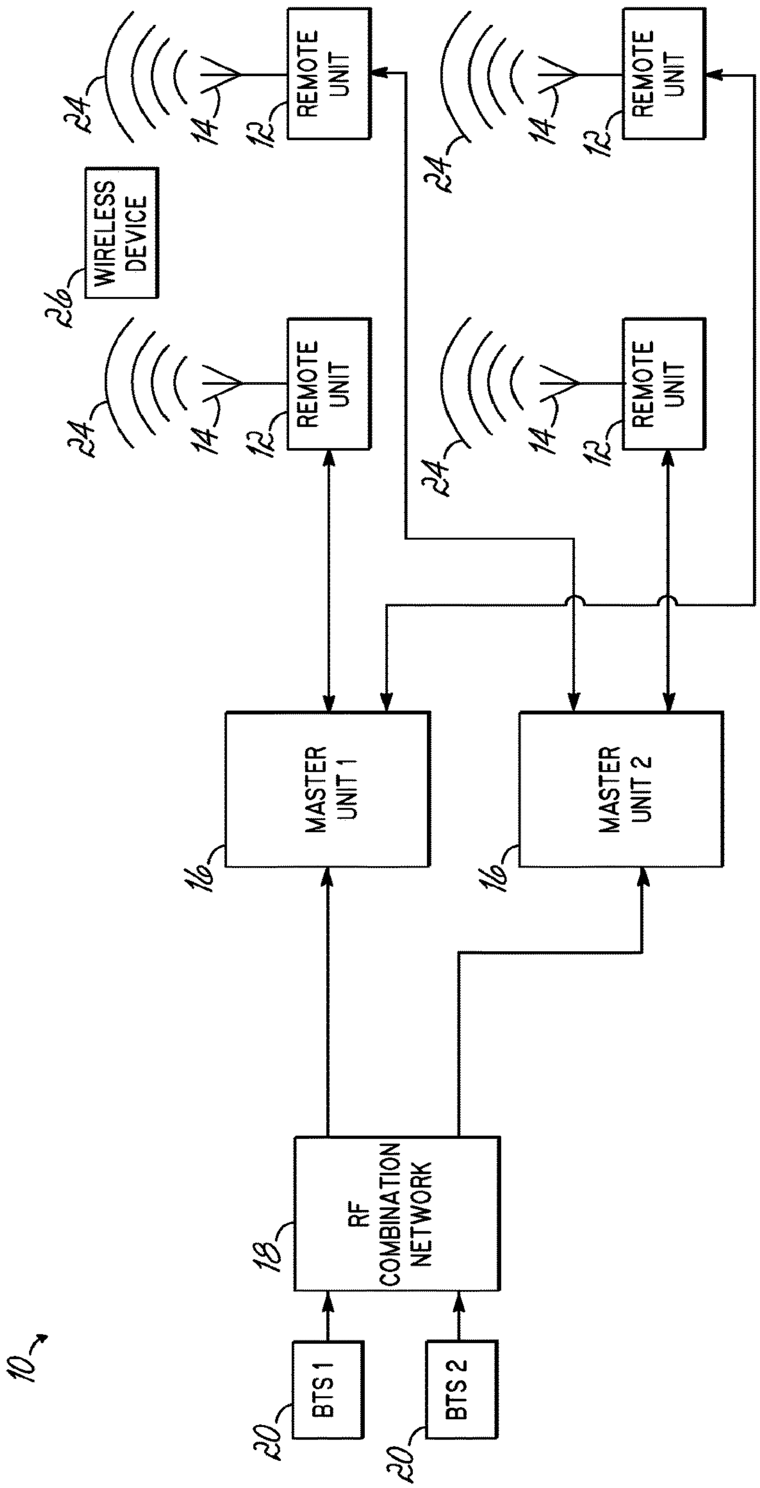
FIG. 1 is a block diagram of a contemporary distributed antenna system.
Figure 2A:
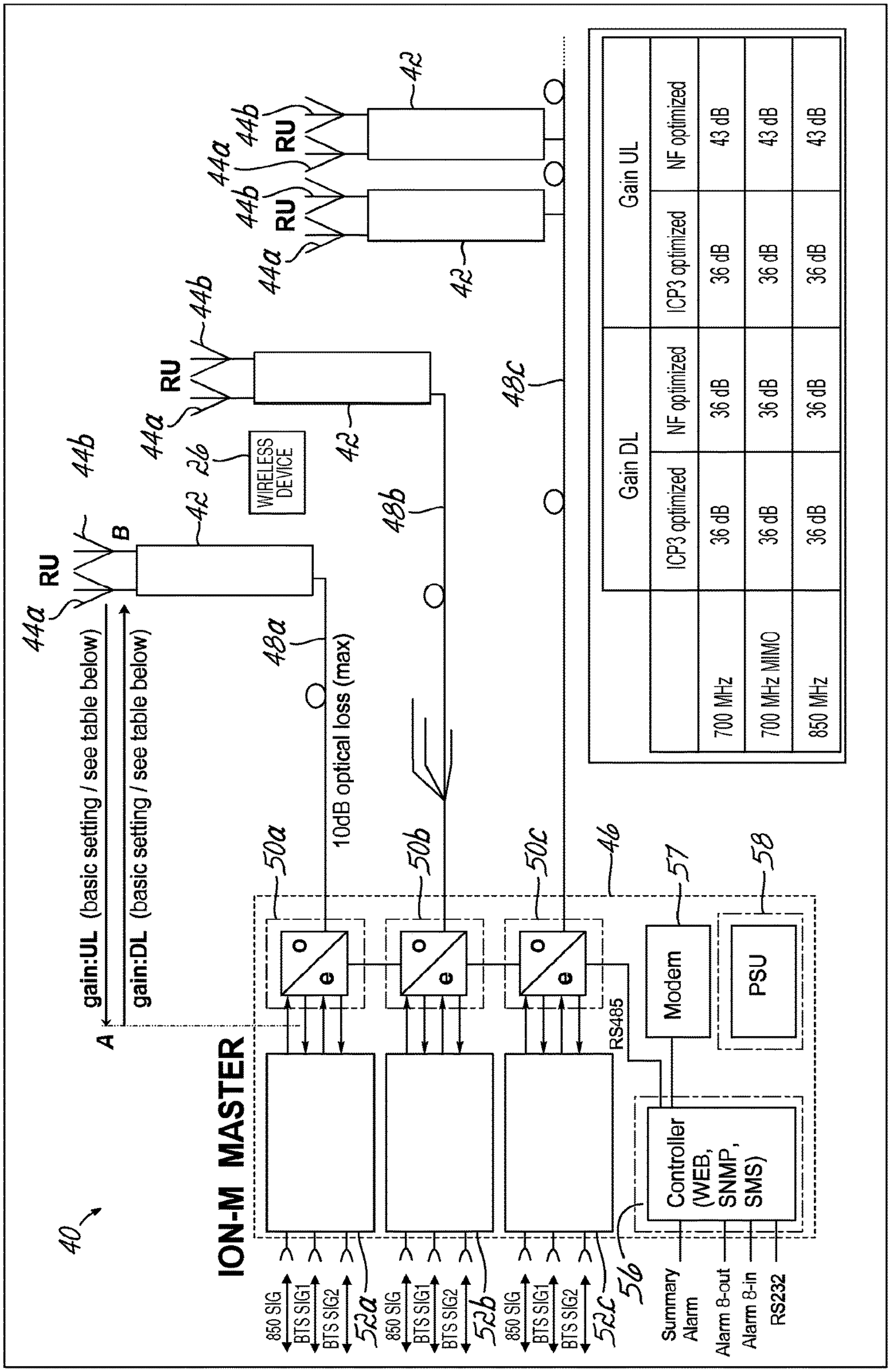
FIG. 2A is a block diagram of a MIMO distributed antenna system ("DAS") that includes a master unit communicating at least three signals to a remote unit consistent with embodiments of the invention.

FIG. 2A is a diagrammatic illustration of a MIMO DAS 40 consistent with embodiments of the invention that further shows downlink ("DL") and uplink ("UL") gain of that MIMO DAS 40. The MIMO DAS 40 includes a plurality of remote units 42 distributed to provide coverage within a service area of the MIMO DAS 40, such as inside a building or some other enclosed area. Each remote unit 42, in turn, includes at least two antennas 44*a-b* and suitable electronics. In various of the disclosed embodiments, a 2×2 MIMO arrangement is illustrated or discussed. It should be understood that other MIMO scenarios, such as 4×4 or 8×8, etc., would also benefit from the invention. Each remote unit 42 is coupled to a master unit 46 through at least one optical link 48, which may include one or more optical fibers (not shown), optical splitters (not shown), or other optical transmission components (not shown). As illustrated in FIG. 2A, one remote unit 42 may be connected directly to the master unit 46 through a direct optical link, such as at link 48*a*. Alternatively, a plurality of remote units 42 may be connected to the master unit 46 in a series connection optical link, such as at link 48*b*. Or a plurality of remote units 42 may be connected to the master unit 46 in a tree connection optical link, such as at link 48*c*. The master unit 46 is configured with a respective electrical-to-optical conversion circuit 50 for each optical link 48 to convert electrical signals at the master unit 46 to optical signals for transmission over the respective optical links 48.

In the downlink direction (e.g., from the master unit 46 to the remote unit 42), the master unit 46 receives at least one signal from at least one MIMO BTS (not shown in FIG. 2A). The master unit 46 may receive signals from other BTSs as well. Specifically, the master unit 46 may receive the signals for the remote units 42 over an input optical link (not shown), or some other suitable fashion, then separate and/or combine the signals within a particular optical link for transmission over the optical link 48 to the remote units 42. The signals from the BTSs may be electrical RF signals, or in some other form for processing. As illustrated in FIG. 2A, the master unit 46 receives two signals from at least one MIMO BTS (illustrated as "BTS SIG1" and "BTS SIG2") as well as a signal in the 850 MHz frequency band (illustrated as "850 SIG") at a first input optical link.

The master unit 46 may frequency convert and/or combine the signals received at an input optical link for the remote unit 42 in a conversion module 52, in accordance with aspects of the invention. Conversion modules 52*a-c* are illustrated in FIG. 2A for handling the various BTS signals. The master unit 46 then converts the electrical signals to optical signals with appropriate electrical-to-optical circuits 50 (50*a*, 50*b*, and 50*c*) and transmits or sends the optical signals to the remote units 42. Similar frequency conversion, combining, and electrical-to-optical conversion takes place for the various optical links 48*a-c*. In the uplink direction (from the remote unit 42 to the master unit 46), the master unit 46 receives optical signals from the remote units 42 and converts the signals from optical signals to electrical signals, then may split and/or frequency convert the signals prior to sending them to the MIMO BTS as discussed further herein.

In the downlink direction (e.g., from the master unit 46 to the remote unit 42), the master unit 46 of the embodiment of FIG. 2A is configured to receive various communication signals in suitable frequency bands as used by service providers, such as a signal in the 850 MHz communication range labeled "850 SIG". Some such signals might be typical signals for conventional SISO systems. The master unit 46 is also configured to receive and process a plurality of MIMO signals for MIMO services. In accordance with one aspect of the invention, the MIMO signals are frequency converted so that the multiple MIMO signals may be handled over a single fiber-optic cable in the uplink and/or downlink directions without loss of the benefits of those multiple signals, such as diversity and spatial multiplexing gain benefits. For example, in accordance with one exemplary embodiment of the invention, the MIMO signals may be in a 700 MHz range, including a first MIMO signal, such as that labeled "BTS SIG1". BTS SIG1 is frequency converted or translated to a signal that falls into a first frequency band FB1. A second MIMO signal in the 700 MHz communication range, such as that labeled "BTS SIG2", is frequency converted to a signal that falls into a second frequency band FB2 (See FIG. 5A). The first frequency band FB1 is different from the second frequency band FB2 so that the signals may be combined on a single fiber-optic cable while maintaining their unique MIMO information. Referring to FIG. 2A, the master unit 46 then combines the signals in the 850 MHz frequency band, the frequency converted MIMO signals and an LO reference having an LO frequency LO1. The master unit 46 directs the combined signals to a remote unit 42 through the optical link 48. As seen in FIG. 2A, the various downlink signals are appropriately converted from electrical to optical signals, and are then transmitted over fiber link 48 to one or more remote units.

In the uplink direction (e.g., to the master unit 46 from the remote unit 42), the master unit 42 is configured to receive the first signal in the 850 MHz communication range. The master unit 46 also receives uplink MIMO signals in a third frequency band FB3 or a fourth frequency band FB4 and converts the signals into uplink MIMO signals with a frequency at their original MIMO frequency. The master unit also receives additional MIMO signals from an additional antenna at the remote unit in a fifth frequency band FB5 or a sixth frequency band FB6 and converts the signals into uplink MIMO signals with a frequency at the frequency of the original MIMO signals, such as in the 700 MHz band (See FIG. 5B). In the uplink direction, the uplink MIMO signals might be received in various uplink MIMO sub-bands. Therefore, for frequency conversion, those MIMO uplink sub-bands may be converted to appropriate sub-bands F3/F4 and F/5/F6 associated with each of the multiple MIMO antennas. The master unit 46 then sends the frequency converted plurality of MIMO signals back to the MIMO BTS. Similar operations may occur for each of the signals for the other optical paths 48*b-c* depending on whether they are frequency converted MIMO signals or non-MIMO signals. While only one particular portion of the master unit 46 and specific remote unit 42 are discussed with respect to the MIMO aspect of the invention in FIG. 2A, it will be understood that the other portions and various associated remote units 42 might also handle MIMO signals.

In some embodiments of the invention, the DAS system and the master unit 46 may be an ION-M series system and master units as distributed by Andrew LLC, a division of CommScope, Inc. of Hickory, N.C. The master unit 46 thus includes a controller 56 that operates similar to previous controllers 56 for ION-M master units 46. As such, the controller 56 controls the operation of the master unit 46 and can be configured across the Internet (the Web) as well as using simple network management protocol ("SNMP") communications or short messaging service ("SMS") communications. The controller 56, in turn, manages the operation of the master unit 46, such as the operation of the electrical-to-optical circuits 50*a-c* through RS485 communications, as well as a modem 57. The controller 56 is also configured to receive data, such as through the modem 57, from a service computer through RS232, summary alarm messages, and data about alarm messages. In turn, the controller 56 outputs data about alarm messages. With respect to the conversion modules 52*a-c*, the controller 56 is further configured to provide alarms related thereto, such as a ConvMod X communication failure (indicating that communication with a conversion module X is lost), a ConvMod X Current alarm (indicating that a current monitored in a conversionmodule X is too high or too low, and a ConvMod X DL LO level too low (indicating that a local oscillator for a conversion module X has received too low a level). The master unit 46 also includes a power supply unit 58 to provide power thereto.

Figure 2B:
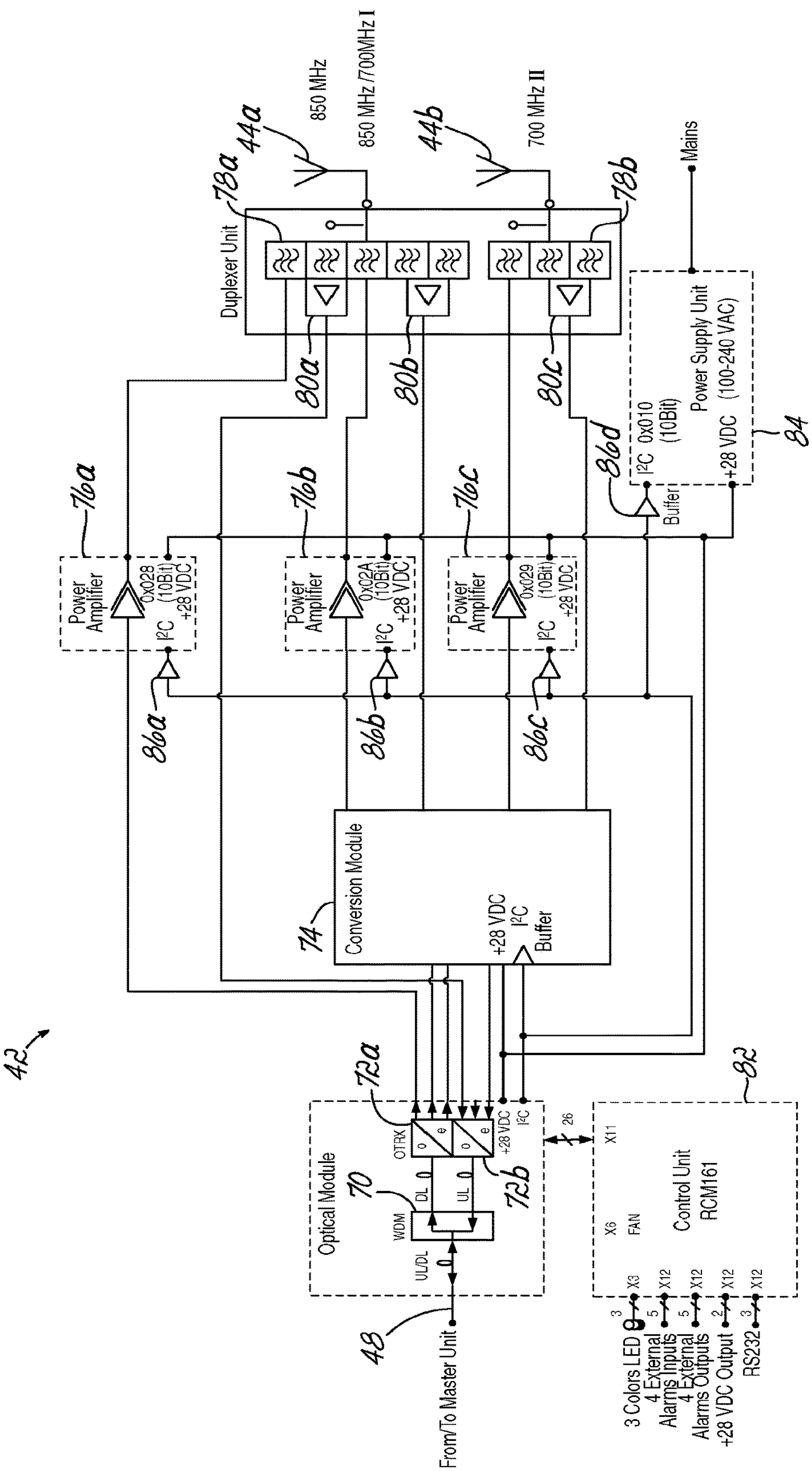
FIG. 2B is a block diagram of the remote unit of the MIMO DAS of FIG. 2A.

Turning to the remote unit 42, this may be an ION-M7P/7P/85P series repeater as also distributed by Andrew LLC. In the disclosed embodiment of FIG. 2B, the uplink and downlink paths between the remote unit 42 and master unit 46 are handled by a single fiber 48. FIG. 2B illustrates that the remote unit 42 may include a wave division multiplexer 68 to split the optical signals for the single fiber-optical link 48 into downlink and uplink signals. In the downlink direction (e.g., from the master unit 46 to the antennas 44*a-b*), the remote unit 42 converts the downlink signals from optical signals to electrical signals using an appropriate optical-to-electrical circuit 72*a*. Circuit 72*a* outputs the signal in the 850 MHz frequency band, the converted plurality of MIMO signals, and the LO signal LO1. The converted MIMO signals are processed by a conversion module 74, which frequency converts the converted MIMO signals back to a specific MIMO band, such as the 700 MHz MIMO band. Such a conversion module is discussed herein below.

Figure 5A:
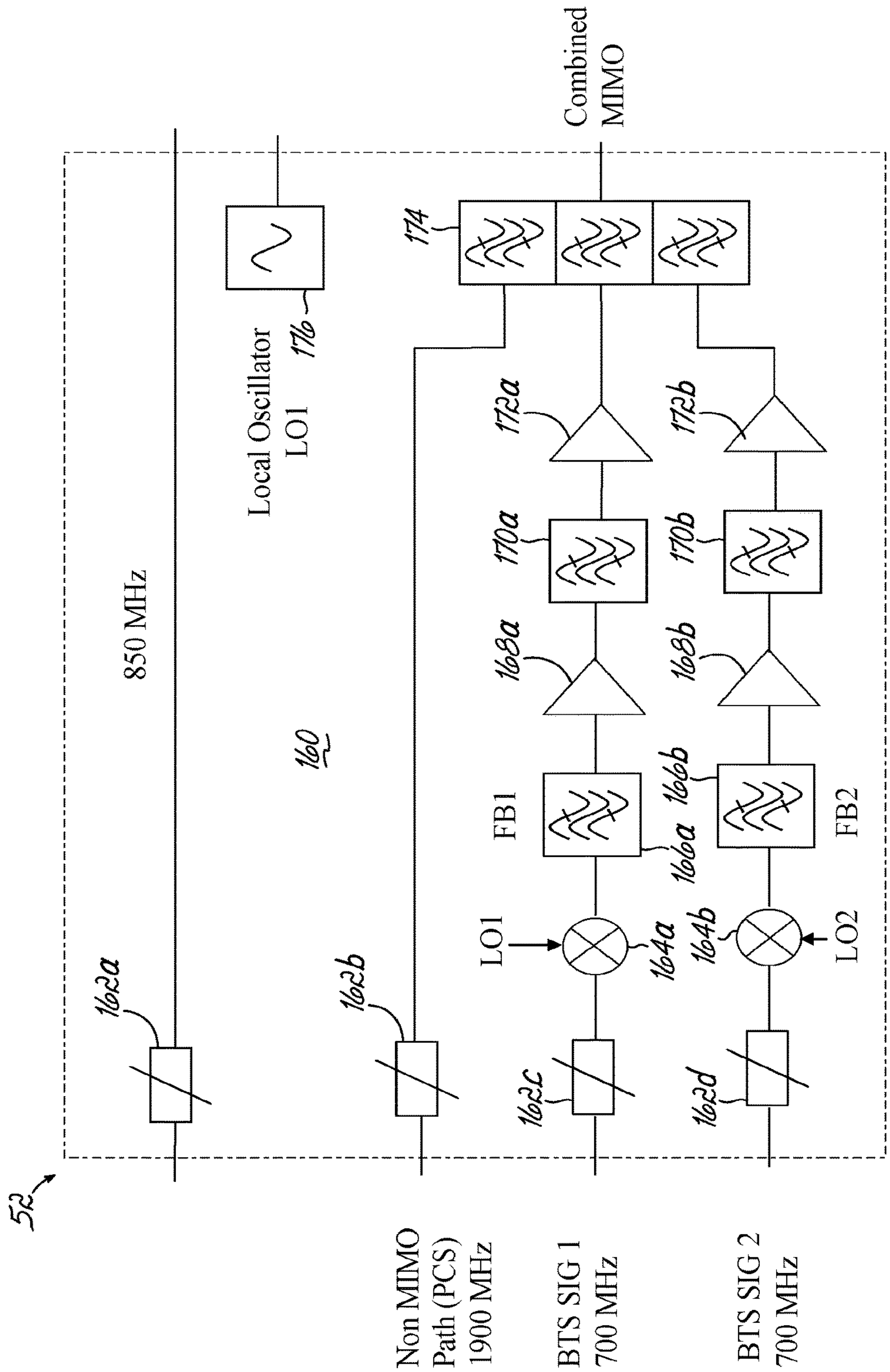
Figure 5B:
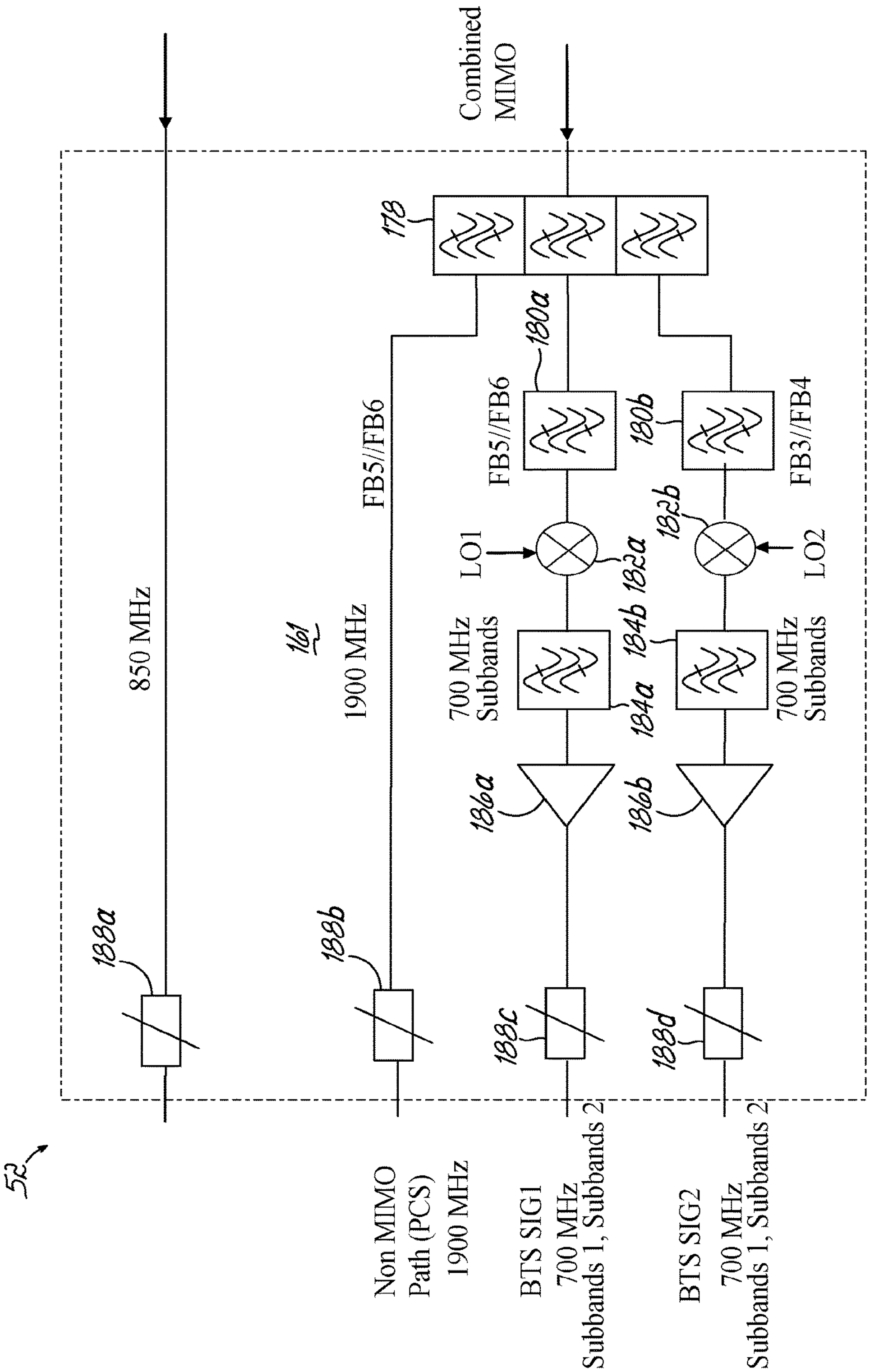
FIG. 5B is a diagrammatic illustration of an uplink portion of the conversion module in the master unit of the MIMO DAS of FIG. 2A, 3A, or 4A.
Figure 5C:
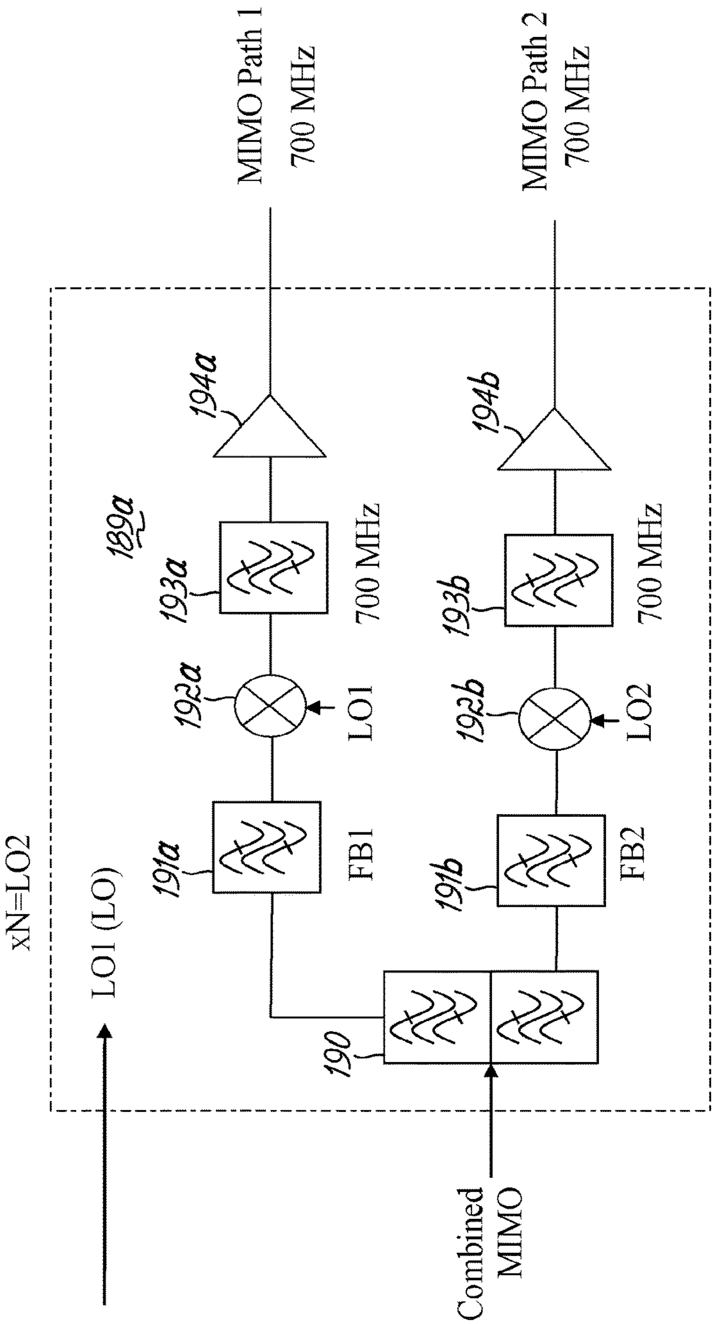

In particular, the conversion module 74 converts the downlink MIMO signals in the first and second frequency bands FB1, FB2 into MIMO signals in the original 700 MHz range (See FIG. 5C). The signals are then amplified and transmitted over an air interface by the remote unit. The remote unit 42 amplifies the downlink signals in the 850 MHz communication range and the plurality of MIMO signals with respective power amplifiers 76 (76*a*, 76*b*, and 76*c*). The signals are then directed to appropriate antennas. The signal in the 850 MHz communication range is combined with one of the MIMO signals in a first duplexer 78*a* for communication through the first antenna 44*a*. Another of the MIMO signals is processed through a second duplexer 78*b* for transmission by the second antenna 44*b*. As such, the remote unit 42 is configured to send and/or receive signals, such as from a wireless device 26, which may also be MIMO enabled and include multiple antennas. As discussed herein, the embodiments discuss essentially two MIMO signals and a remote unit 42 with two antennas 44*a-b*. However, as noted above, it will be readily understood that the invention is also applicable with systems using a greater number of MIMO signals than two.

In the uplink direction (e.g., from the remote unit 42 to the master unit 46), the remote unit 42 separates the signal in the 850 MHz communication range from one of the MIMO signals, which has a frequency in one of the 700 MHz sub-bands used for uplink MIMO signals, via the duplexer 78*a*. The other MIMO signal also has a frequency in one of the 700 MHz MIMO sub-bands. The duplexer, in the uplink, is configured to handle the different frequency bands or sub-bands associated with the MIMO uplink signals.

The remote unit 42 then amplifies the 850 MHz and MIMO uplink signals via respective amplifiers 80*a-c*, such as LNAs, and then frequency converts the MIMO signals in the conversion module 74. In particular, the remote unit 42 converts one of the MIMO signals to a frequency in the third or fourth frequency band or sub-band FB3, FB4, and converts the other MIMO signal to a frequency in the fifth or sixth frequency band or sub-band FB5, FB6. The conversion module 74 then combines the multiple MIMO signals, and the remote unit 42 provides the 850 MHz signal and the combined MIMO signals for conversion to optical signals to the electrical-to-optical circuit 72*b*. The remote unit 42 then wave division multiplexes the uplink optical signal onto an optical link 48 using the wave division multiplexer 70. A controller 82 controls the operation of the remote unit 42. As illustrated in FIG. 2B, the controller 82 is illustrated controlling the electrical-to-optical circuits 72*a*-*b* as well as monitoring power provided by a power supply unit 84 and through various buffers 86*a*-*d*, though one having ordinary skill in the art will appreciate that the controller 82 controls additional operations thereof, such as status, alarm management, and alarm reporting, as noted above.

As illustrated in FIGS. 2A and 2B, the MIMO DAS 40 may have a downlink gain in the 700 MHz frequency band (whether a normal communication band or a MIMO specific communication band) of about 36 dB, whether that gain is measured using ICP3 optimized methods or NF optimized methods. Moreover, the MIMO DAS 40 has a downlink gain in the 850 MHz frequency band) of about 36 dB, also whether that gain is measured using ICP3 optimized methods or NF optimized methods. Similar gains are illustrated in the 700 MHz frequency band, 700 MHz MIMO specific communication band, and 850 MHz frequency band for ICP3 optimized measurements of uplink gain. However, the MIMO DAS 40 includes, for uplink gain measured using NF optimized methods, about 43 dB of gain for the 700 MHz frequency band, 700 MHz MIMO specific communication band, and 850 MHz frequency band.

Figure 3A:
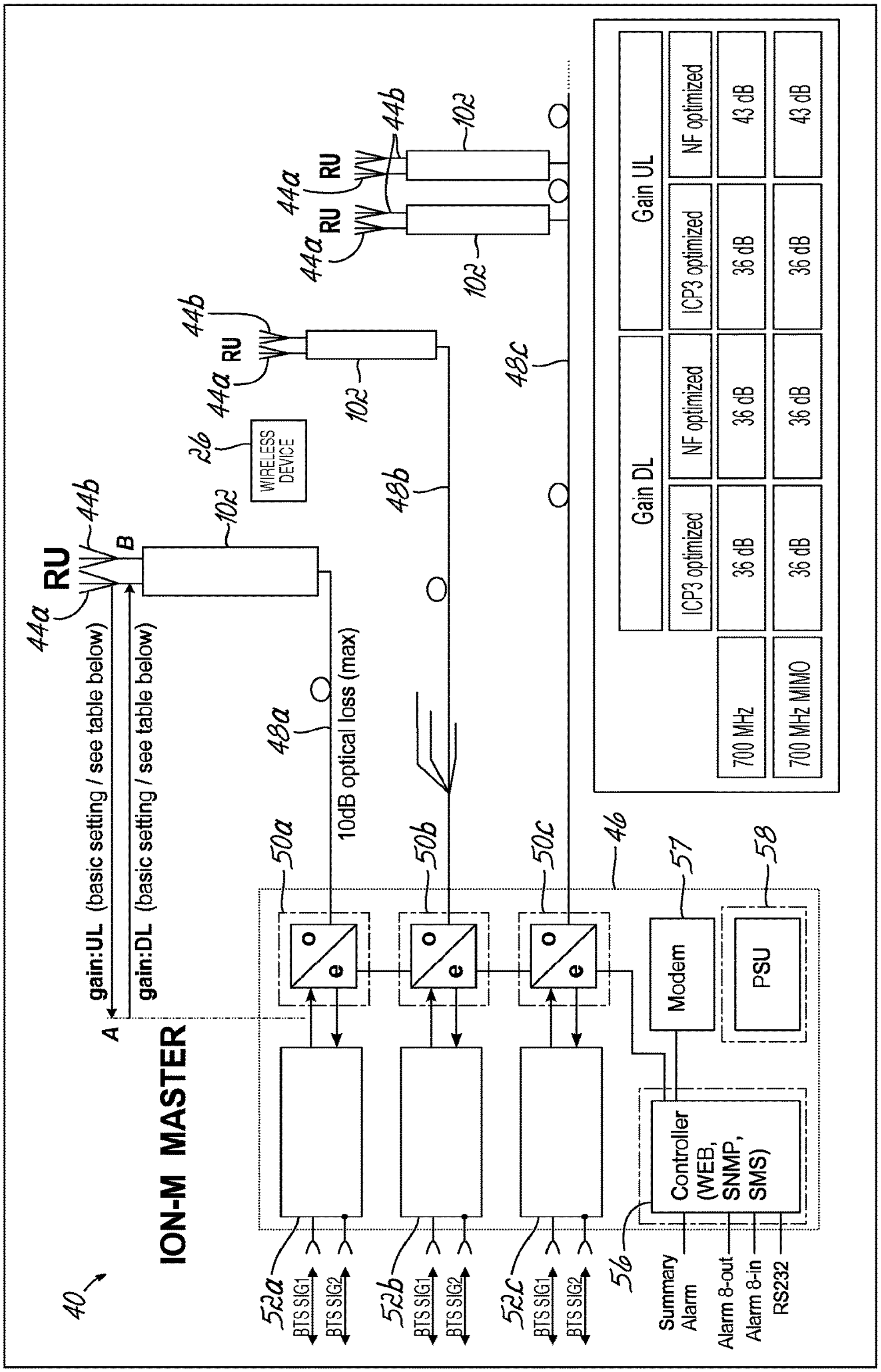
FIG. 3A is a block diagram of a MIMO DAS that includes a master unit communicating at least two signals to a remote unit consistent with embodiments of the invention.

In some embodiments, a DAS system might utilize dedicated MIMO remote units, rather than combining the MIMO service with other service frequency bands. As such, the master unit 46 may transceive the two signals from at least one MIMO BTS on an optical link 48*a* with one or more MIMO remote units 42. In particular, two or more MIMO signals in the 700 MHz frequency band (e.g., signals labeled "BTS SIG1" and "BTS SIG2") are utilized. FIG. 3A is a diagrammatic illustration of a MIMO DAS 100 that includes such a dedicated remote MIMO unit 102. The remote units 102 are configured to transmit two MIMO signals, such as BTS SIG1 and BTS SIG2 in a 700 MHz frequency band. As such, the remote units 102 of FIG. 3B include many similar components to the remote units 42 illustrated in FIG. 2B. It utilizes power amplifiers 76*a*-*b*, duplexers 78*a*-*b*, amplifiers 80*a*-*b*, such as LNAs, and buffers 86*a*-*c*. The frequency conversion module 74 converts the two signals similarly to the manner as disclosed above for the plurality of MIMO signals discussed in connection with FIG. 2B. The remote unit 102 transmits one MIMO signal via the first antenna unit 44*a* and transmits the other MIMO signal via the second antenna unit 44*b*. Thus, the remote unit 102 may be an ION-M7P/7P series repeater unit, as also distributed by Andrew LLC.

Figure 3B:
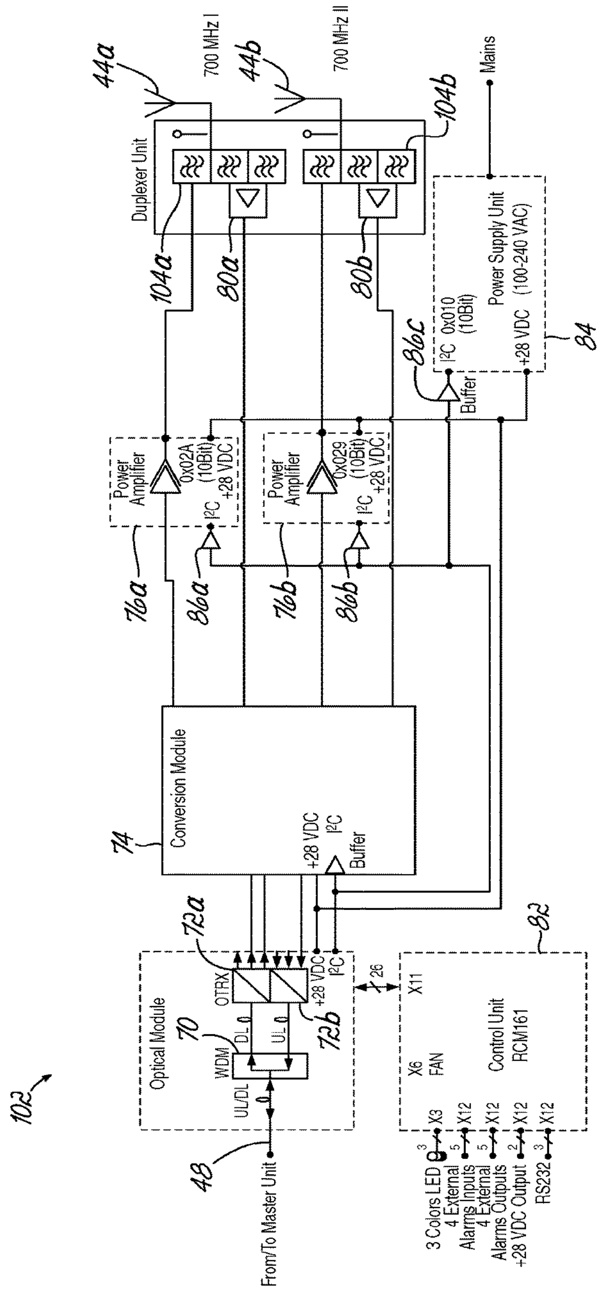
FIG. 3B is a block diagram of the remote unit of the MIMO DAS of FIG. 3A.

As illustrated in FIGS. 3A and 3B, the MIMO DAS 100 may have a downlink gain in the 700 MHz frequency band (whether a normal communication band or a MIMO specific communication band) of about 36 dB, whether that gain is measured using ICP3 optimized methods or NF optimized methods. Similar gains are illustrated in the 700 MHz frequency band and the 700 MHz MIMO specific communication band for ICP3 optimized measurements of uplink gain. However, the MIMO DAS 100 includes, for uplink gain measured using NF optimized methods, about 43 dB of gain for the 700 MHz frequency band and the 700 MHz MIMO specific communication band.

Figure 4A:
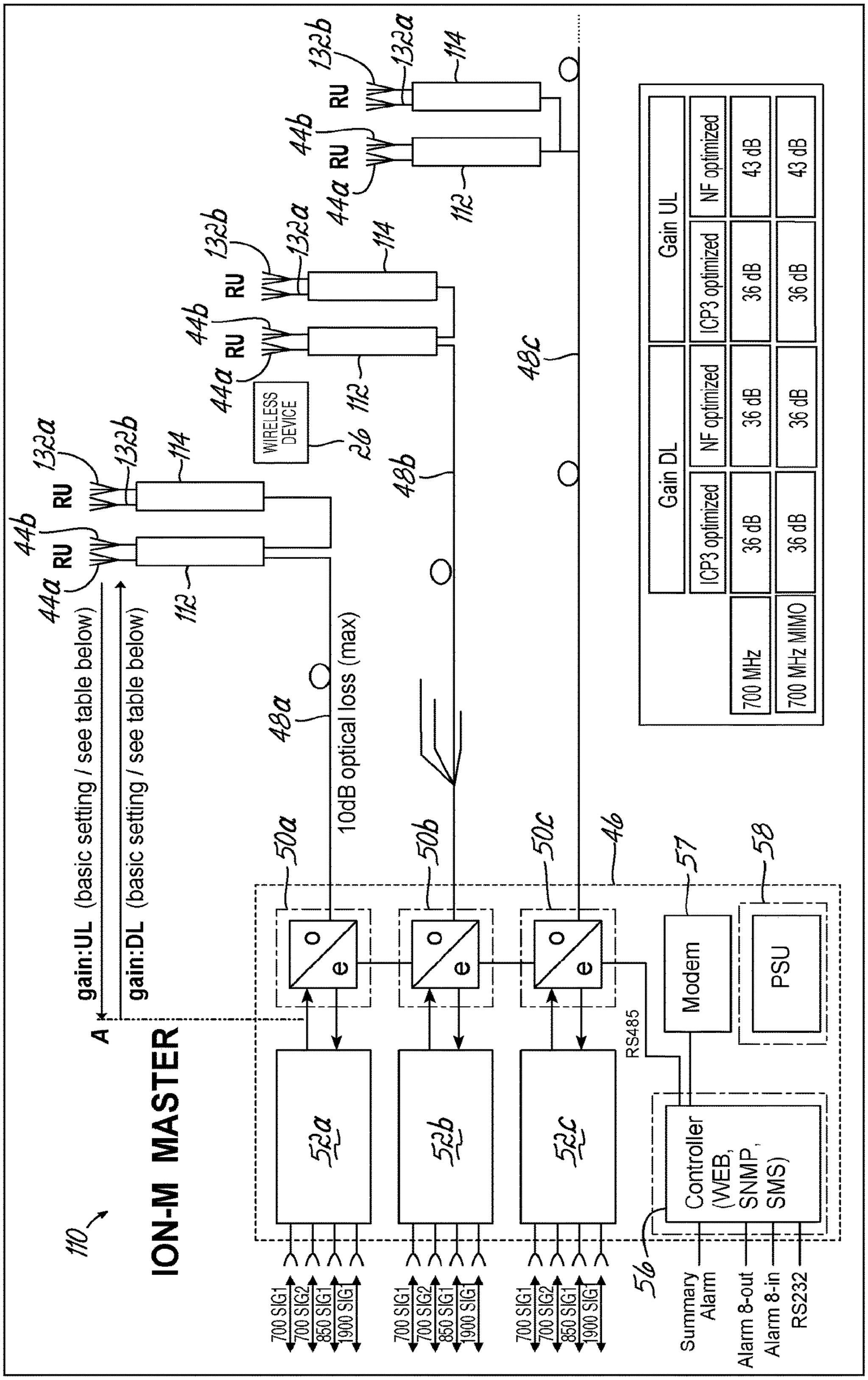
FIG. 4A is a block diagram of a MIMO DAS that includes a master unit communicating signals to a remote unit connected to an extension unit consistent with embodiments of the invention.

In various scenarios, legacy DAS systems may be set up as SISO systems without MIMO operable remote units. In alternative embodiments of the invention, an extension unit may be utilized in combination with the remote units to extend the range of a MIMO DAS. FIG. 4A is a diagrammatic illustration of a MIMO DAS 110 that includes a remote unit 112 configured to communicate with an extension unit 114 through an extension port. As illustrated in FIG. 4A, the master unit 46 may be configured to receive appropriate service signals from the BTS, including a signal in the 850 MHz frequency band labeled "850 SIG", as well as a signal in the 1900 MHz frequency band labeled "1900 SIG", and the master unit 46 also receives a plurality of MIMO signals in the 700 MHz frequency band. As such, the master unit 46 frequency converts MIMO signals in the 700 MHz frequency band to frequencies in the first or second frequency band FB1, FB2 and combines the frequency shifted MIMO signals with the signals in the 1900 MHz frequency band to send over the optical link. The master unit 46 then combines and sends the 850 SIG, the combined 1900 SIG and converted MIMO 700 SIG, and an LO reference signal across the optical link 48*a* to the remote unit 112.

Figure 4B:
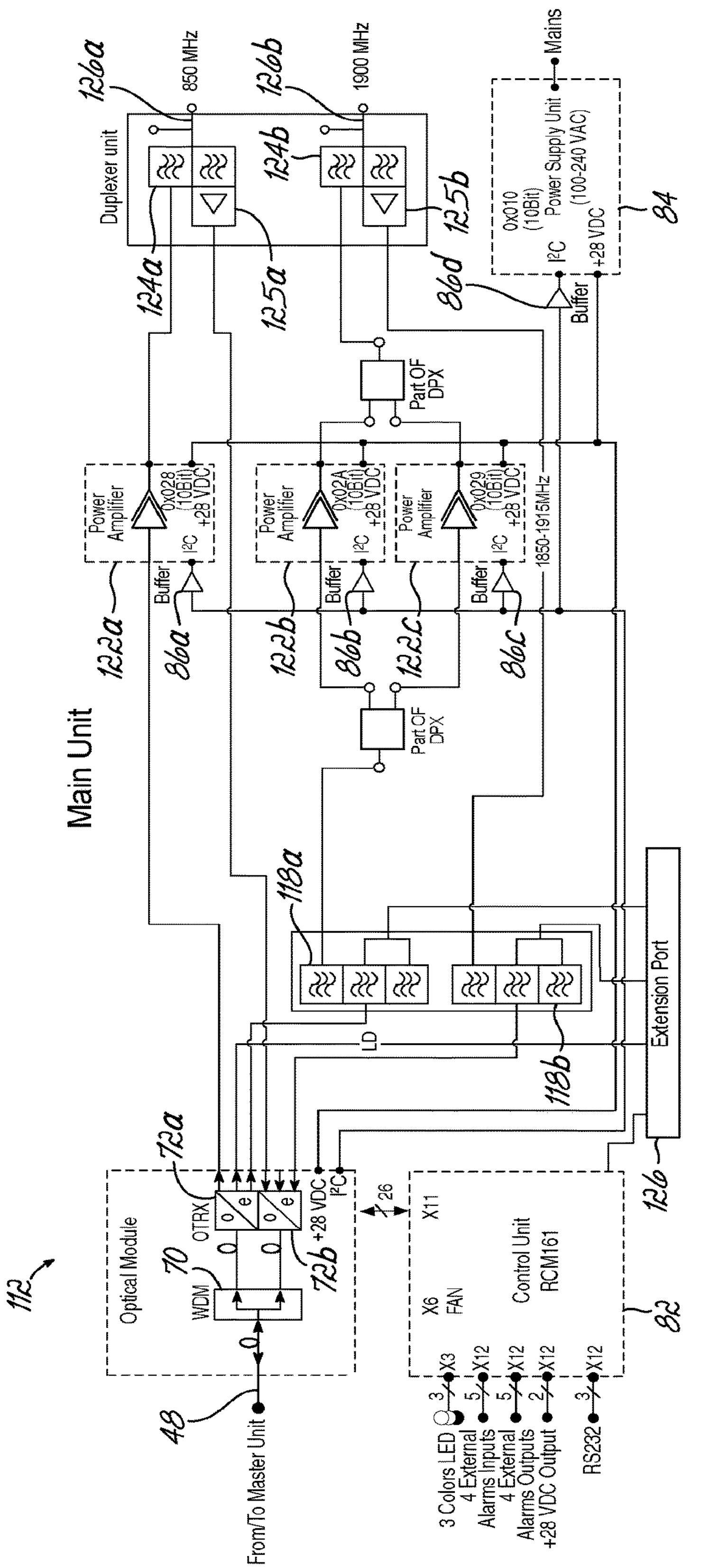
FIG. 4B is a block diagram of the remote unit of the MIMO DAS of FIG. 4A.

In the downlink direction and as illustrated in FIG. 4B, the remote unit 112 receives the combined signals and converts them from optical signals to a plurality of electrical signals. As such, the remote unit 112 includes wave division multiplexer 70 and the optical-to-electrical circuits 72*a*-*b*, as discussed above. In particular, the remote unit 112 provides the signal in the 850 MHz frequency service band along a different path than the signal that contains the combined 1900 MHz frequency band service signal and the converted 700 MHz frequency MIMO band signal. As shown in FIG. 4B, the 850 MHz signals are provided directly to an antenna port 126*a* through duplexer 124*a*. The combined 1900 MHz signals are provided to a duplexer 118*a* that splits the 1900 MHz frequency service band signals from the frequency converted 700 MHz frequency MIMO band signals. The 850 MHz frequency band signal and the 1900 MHz frequency band signal are then amplified by respective amplifiers 122 (122*a*, 122*b*, and 122*c*). In turn, the 850 MHz frequency band signals are duplexed by duplexer 124*a* and transmitted via a first antenna 44*a* that may be coupled to antenna port 126*a*. The 1900 MHz frequency band signals are duplexed by duplexer 124*b* and transmitted via a second antenna 44*b* that may be coupled to antenna port 126*b*. Therefore, the remote unit handles transceiving the 850 MHz and 1900 MHz signals. In the uplink direction, the 850 MHz frequency band signals and the 1900 MHz frequency band signals are amplified by respective amplifiers 125 (125*a* and 125*b*), such as LNA's. The amplified 850 MHz frequency band signals are then provided back to the electrical-to-optical circuit 72*b* while the amplified 1900 MHz frequency band signals are provided to the duplexer 118*b* for combination with any uplink frequency shifted 700 MHz frequency MIMO band signals.

Figure 4C:
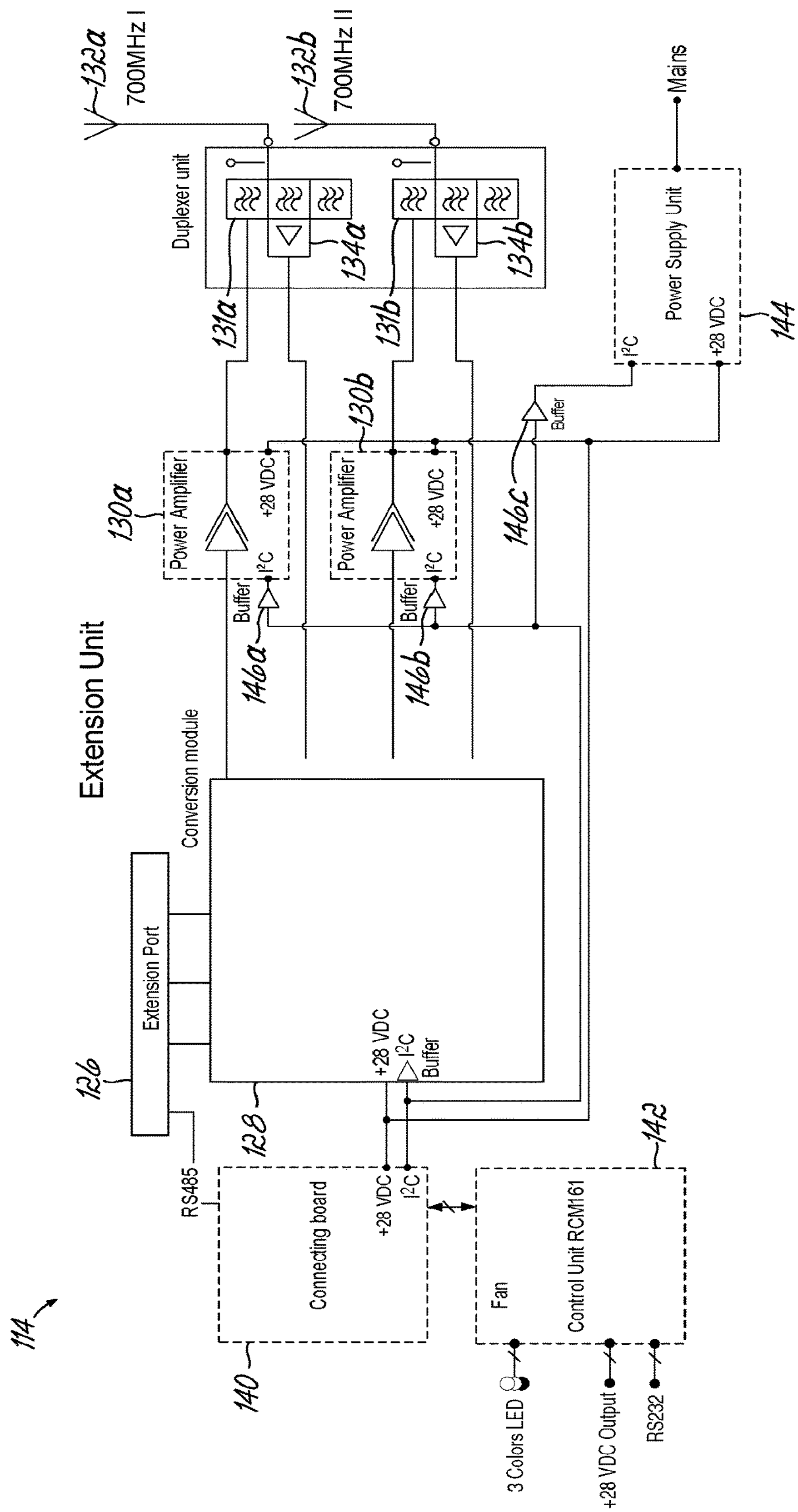
FIG. 4C is a block diagram of the extension unit of the MIMO DAS of FIG. 4A.

With respect to the frequency converted 700 MHz frequency MIMO band signals, they are provided, along with the LO reference, in the downlink direction, to an extension port 126 through duplexer 118*a*. The exterior port is connected to extension unit 114. FIG. 4C is an illustration of one embodiment of such an extension unit 114.

The extension unit 114 receives the converted 700 MHz frequency MIMO band signals, which are in the first or second frequency band FB1, FB2, and converts the signals back to the MIMO band for the air interface through the extension unit. Specifically, the extension unit converts the MIMO signals in a conversion module 128 to signals in the range of the original MIMO frequency and splits that signal. The split signals are amplified by respective power amplifiers 130 (130*a* and 130*b*) then output through respective duplexers 131 (131*a* and 131*b*) to respective antenna ports and antennas 132*a* and 132*b*. Thus, the MIMO DAS 110 transmits the signals in the 850 MHz band and the 1900 MHz band on respective antennas 44 of the remote unit 112, while transmitting the MIMO signals in the 700 MHz band on both antennas 132 of the extension unit 114.

In the uplink direction, the extension unit 114 provides MIMO signals that are received via antennas 132*a* and 132*b* in the original MIMO frequency through the respective duplexers 131*a* and 131*b* to be amplified by respective low noise amplifiers 134*a* and 134*b*. The MIMO signals are then converted into a seventh frequency band or sub-band FB7, or an eighth frequency band or sub-band FB8 in the extension unit 114 using frequency conversion module 128. This converted 700 MHz frequency band signal is, in turn, provided over the extension port 126 back to remote unit 112 to be forwarded to the master unit. In the illustrated embodiment, the MIMO signals are duplexed with the uplink 1900 MHz band frequency signal received by the remote unit and provided at duplexer 118*b*. The output of duplexer 118*b* is then processed by the electrical-to-optical circuit 72*b* for transmission over the optical link 48.

As illustrated in FIG. 4C, the extension unit 114 also includes a connecting board 140 that receives the RS485 signal from controller 82 of the remote unit 112 through the extension port 126. The extension unit 114 further includes a control unit 142 that controls the operation of the extension unit 114 and a power supply unit 144 that powers the extension unit 114. As illustrated in FIG. 4C, the extension unit 114 may include one or more buffers 146*a-c*.

As illustrated in FIGS. 4A-4C, the MIMO DAS 110 may have a downlink gain in the 700 MHz frequency band (whether a normal communication band or a MIMO specific communication band) of about 36 dB, whether that gain is measured using ICP3 optimized methods or NF optimized methods. Similar gains are illustrated in the 700 MHz frequency band and the 700 MHz MIMO specific communication band for ICP3 optimized measurements of uplink gain. However, the MIMO DAS 110 includes, for uplink gain measured using NF optimized methods, about 43 dB of gain for the 700 MHz frequency band and the 700 MHz MIMO specific communication band.

Thus, FIGS. 2A-2B, 3A-3B, and 4A-4C illustration various MIMO DAS's consistent with embodiments of the invention.

In disclosed embodiments, each frequency conversion module 52, 74, and/or 128 for the master, remote, and extension units, generally includes a downlink portion and an uplink portion for handling the signal traffic. FIG. 5A is one embodiment of a downlink portion 160 of a frequency conversion module 52/74/128 for a master unit 46 that may be used to frequency convert signals in the 700 MHz frequency band as well as to combine those converted signals with another service signal, such as a signal in the 1900 MHz frequency band. In particular, the downlink portion 160 receives the various service signals, as well as the MIMO signals, from an appropriate source, such as the BTS. The conversion module section 160 may attenuate any of the 850 MHz frequency band signals, the 1900 MHz frequency band signals, or the 700 MHz frequency MIMO band signals with respective attenuators 162 (162*a*, 162*b*, 162*c*, and 162*d*). Those signals might then be forwarded for further processing, such as amplification and/or frequency conversion, in accordance with the present invention. The downlink portion 160 provides frequency conversion by mixing with mixer 164*a*, the MIMO BTS SIG1 with an LO having a first frequency LO1 signal generated by a suitable LO circuitry 176 to produce a first converted MIMO signal in the first frequency band FB1. The downlink portion 160 also mixes, with mixer 164*b*, the MIMO BTS SIG2 with an LO signal at the second LO frequency LO2 (which is an integral multiple of the first LO signal frequency LO1) to produce another converted MIMO signal in the second frequency band FB2. These converted signals are then filtered further by respective filters 166 (166*a* and 166*b*), amplified by respective amplifiers 168 (168*a* and 168*b*), filtered further by respective filters 170 (170*a* and 170*b*), and amplified by respective amplifiers 172 (172*a* and 172*b*).

As illustrated in FIG. 5A, a frequency conversion module might also provide some combination of other service signals with the MIMO signals that have been frequency converted. Other service signals might pass directly from the master unit to the remote unit, without being significantly affected. For example, as shown in FIG. 5A, a service signal, such as a non-MIMO 800 MHz signal, might be forwarded directly through to a remote unit. Alternatively, a non-MIMO 1900 MHz signal might be combined or duplexed with the converted MIMO signals. As would be readily understood, the combination of such signals may depend upon the frequency conversion that takes places with respect to the MIMO signals and their frequency as presented onto the fiber link. In FIG. 5A, the 1900 MHz frequency band signal or other service is combined with the two converted MIMO signals by duplexer 174 to provide a combined MIMO signal to an optical-to-electrical circuit 50.

FIG. 5B is an illustration of an uplink portion 161 of a frequency conversion module 52 for a master unit 46 that may be used to split frequency converted MIMO signals in the 700 MHz frequency band from a non-converted service signal in the 1900 MHz frequency band, and to further convert the converted MIMO signals. Thus, the uplink portion 161 generally acts in the opposite manner of the downlink portion 160. For example, referring to FIG. 4B, the uplink signal from a remote unit may include frequency converted MIMO signals that are combined with a 1900 MHz signal. As such, the uplink portion 161 includes a duplexer 178 that splits the 1900 MHz frequency band signals from converted 700 MHz frequency MIMO band signals (e.g., one or more signals in the third, fourth, fifth, or sixth frequency bands/sub-bands FB3, FB4, FB5, FB6). The duplexer circuitry further splits a signal in the fifth or sixth frequency band/sub-band FB5, FB6 and the signal in the third or fourth frequency band/sub-band FB3, FB4 into two separate, frequency converted channels. The signals in the frequency converted channels are thus filtered by respective filters 180 (180*a* and 180*b*) and mixed by respective mixers 182 (182*a* and 182*b*). In particular, the signals in the fifth or sixth frequency band FB5, FB6 are mixed, by mixer 182*a*, with an LO signal at the first LO frequency LO1 to produce MIMO signals in desired MIMO uplink frequency bands. The signals in the third or fourth frequency band/sub-band FB3, FB4 are mixed, by mixer 182*b*, with the LO signal at the second LO frequency LO2 to also produce MIMO signals also in the desired MIMO uplink frequency bands. The MIMO signals in the 700 MHz frequency band in the two channels are then filtered by respective filters 184 (184*a* and 184*b*) and amplified by respective amplifiers 186 (186*a* and 186*b*), and/or then attenuated by respective attenuators 188 (188*c* and 188*d*) to output as MIMO signals BTS SIG1 and BTS SIG2 to transmit back to a BTS or other location. The 850 MHz frequency band signals and 1900 MHz frequency band signals are likewise attenuated by respective attenuators 188 (188*a* and 188*b*) as necessary.

FIG. 5C is an illustration of a downlink circuit portion 189*a* of a frequency conversion module 74, 128 that may be included in a remote unit 42, 102, and/or 112, or an extension unit 114. The downlink circuit portion 189*a* receives an LO reference signal (which is the LO signal at the first LO frequency LO1) from the master unit. The circuit also receives frequency converted MIMO signals, such as an converted 700 MHz frequency MIMO band signal, and duplexes the converted MIMO signals into two channels with a duplexer 190. The signals in each channel are then filtered with respective filters 191 (191*a* and 191*b*). In turn, the signal in one channel, which is in the first frequency band FB1, is mixed by mixer 192*a* with the LO signal at the first LO frequency LO1 to produce a first signal in the 700 MHz MIMO downlink frequency band. The signal in the other channel, which is in the second frequency band FB2, is mixed by mixer 192*b* with an LO signal at the second LO frequency LO2 (which is an integral multiple of the first LO frequency LO1) to produce a second signal in the 700 MHz MIMO downlink frequency band. The MIMO signals are then filtered via respective filters 193 (193*a* and 193*b*) and amplified by respective amplifiers 194 (194*a* and 194*b*) before being output from the conversion circuitry for eventual transmission.

Figure 5D:
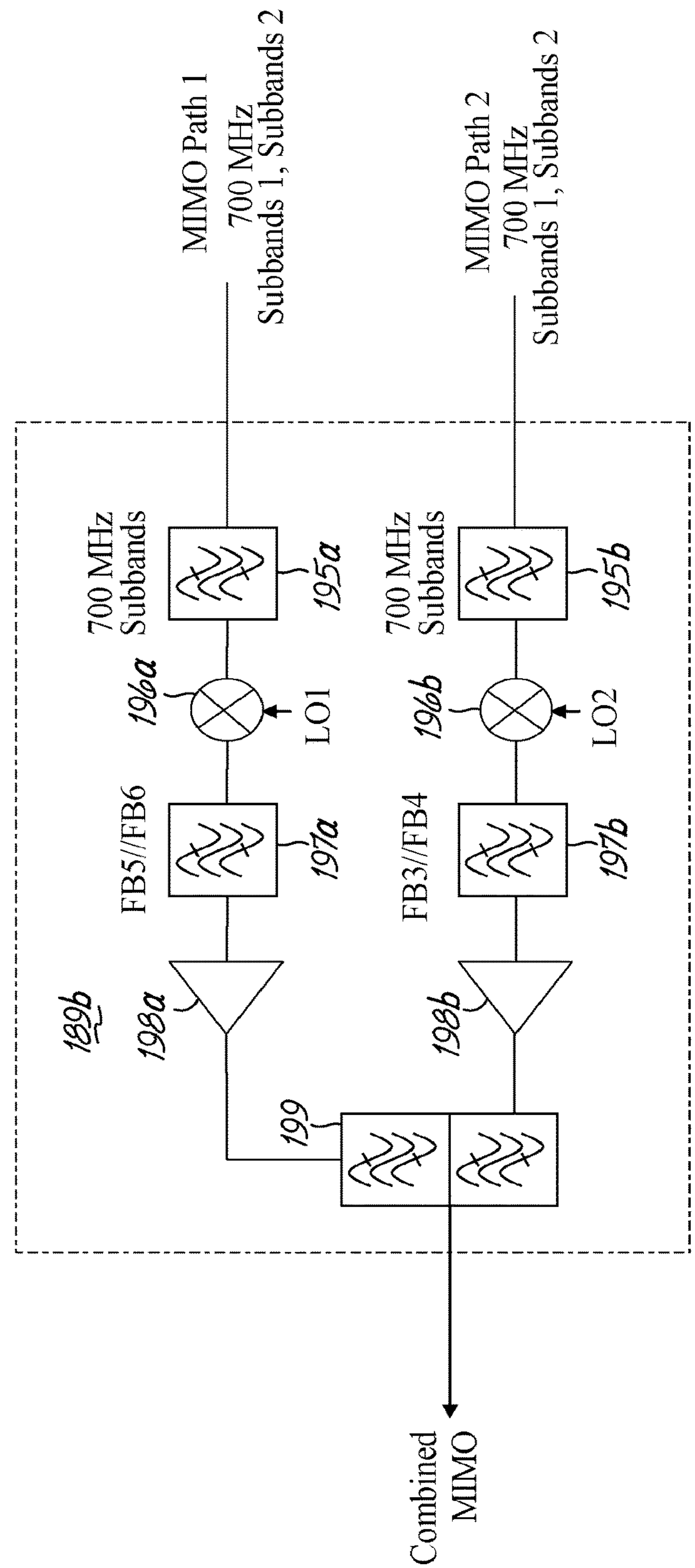
FIG. 5D is a diagrammatic illustration of an uplink portion of the conversion module in the remote unit and/or extension unit of the MIMO DAS of FIG. 2A, 3A, or 4A.

Similarly, FIG. 5D is an illustration of an uplink circuitry portion 189*b* of a frequency conversion module 74, 128 that may be included in a remote unit 42, 102, and/or 112, or an extension unit 114. Thus, the uplink portion 189*b* generally acts in an opposite manner to the downlink portion 189*a*. The uplink portion 189*b* includes two channels that each receives signals in the 700 MHz MIMO uplink frequency bands or sub-bands from suitable antennas and antenna ports. The signals in the channels are filtered by respective filters 195 (195*a* and 195*b*). In turn, the signal in one MIMO channel is mixed by mixer 196*a* with the LO signal at the first LO frequency LO1 to produce a first frequency converted uplink signal having a frequency in the fifth frequency band FB5 and the sixth frequency band FB6. The signal in the other MIMO channel is mixed by mixer 196*b* with a an LO signal at the second LO frequency LO2 (which is an integral multiple of the first LO signal at frequency LO1) to produce another converted uplink signal having a frequency in the third frequency band FB3 and the fourth frequency band FB4. The first and second converted signals are then filtered by respective filters 197 (197*a* and 197*b*), amplified by respective amplifiers 198 (198*a* and 198*b*), and combined by a suitable duplexer 199. The combined converted MIMO signal is then presented for transmission, in the uplink direction, over fiber link 48, back to the master unit.

In accordance with one aspect of the invention, as illustrated in FIGS. 2A-4C, the converted MIMO signals and other service signals are transmitted between the master unit and the various remote units and extension units implementing a single fiber that handles both the uplink signals and the downlink signals. Because of the frequency conversion provided for the various MIMO signals, the integrity of the MIMO process is maintained when the multiple MIMO signals originally having the same frequency are transmitted over a single cable, such as a single fiber-optic cable or link. In such a scenario, each of the individual MIMO signals is maintained at different frequencies in both the uplink direction and the downlink direction. That is, all the uplink MIMO signals have different frequencies, and all the downlink MIMO signals have different frequencies. Furthermore, to maintain the segregation between uplink and downlink signals over a single fiber-optic cable, all of the MIMO signals being transmitted in the downlink direction are at different frequencies from those that are being transmitted in the uplink direction.

In accordance with a further embodiment of the invention, the DAS system may incorporate separate cables, such as separate fiber-optic cables, between the master unit and any remote units or extension units. In such a case, the downlink signals are handled on a separate fiber-optic cable from the uplink signals.

Figure 6A:
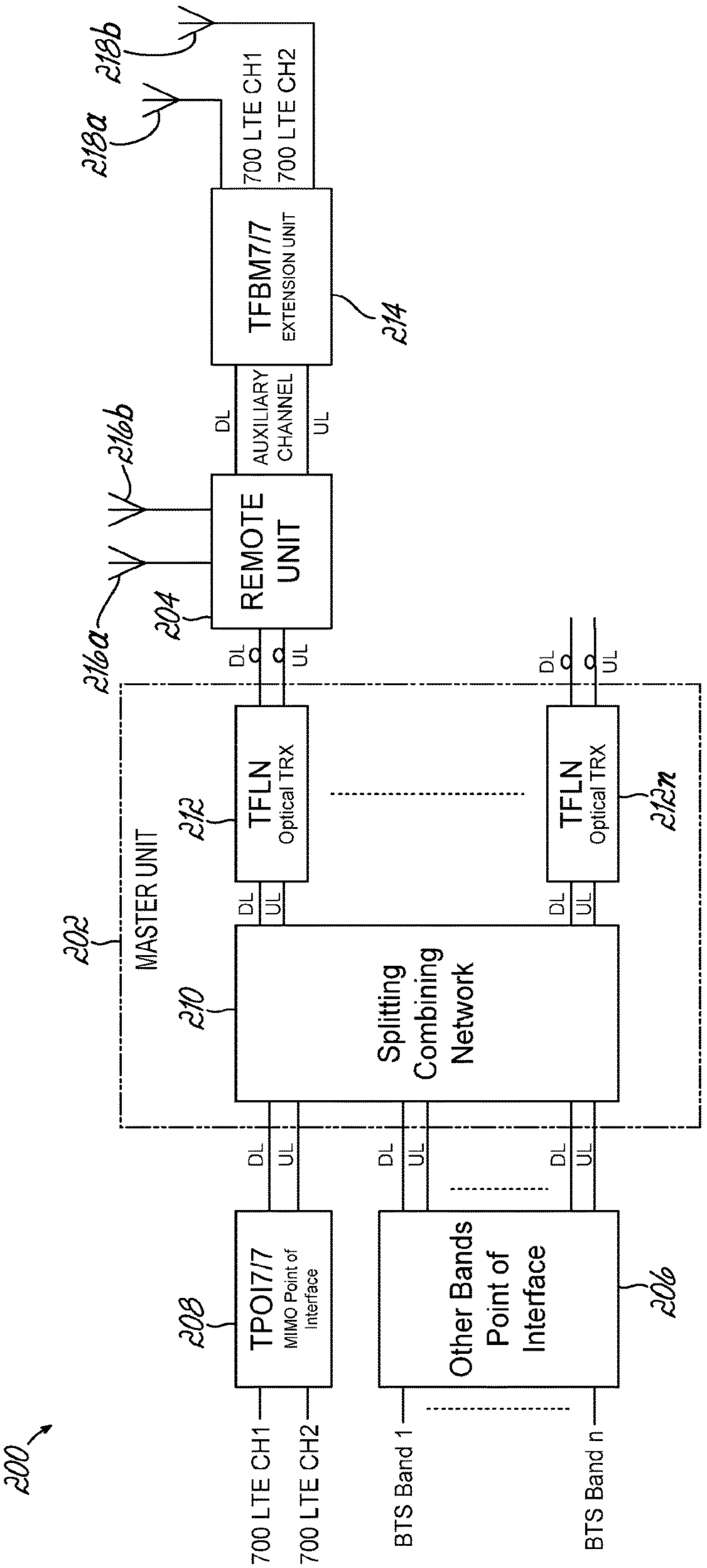
FIG. 6A is a block diagram of a legacy DAS converted to a MIMO DAS using a MIMO point of interface component as well as at least one extension unit consistent with embodiments of the invention.

FIG. 6A is a diagrammatic illustration of another embodiment of a MIMO DAS 200 that may be configured using a legacy DAS system, and in particular a legacy SISO DAS. Specifically, the MIMO DAS 200 includes a master unit 202. For example, the master unit might be an ION-B master unit, as distributed by Andrew LLC. The master unit is configured to provide signals to a plurality of remote units 204, such as ION-B remote units, which are also distributed by Andrew LLC. The present invention, therefore, might be used to provide a legacy system with MIMO capabilities. In a normal mode of operation, the master unit 202 is configured to send and receive signals from one or more plurality of BTSs, such as through a BTS point of interface component 206. Such BTS Bands 1-n might be conventional, non-MIMO service bands, for example. To implement a MIMO operation, the master unit 202 is additionally configured to send and receive signals through a MIMO point of interface component 208. For purposes of illustration, the MIMO signals are illustrated as a MIMO signal in the 700 MHz frequency band (illustrated as "700 LTE CH1") and another, different MIMO signal in the 700 MHz frequency band (illustrated as "700 LTE CH2").

In the downlink direction, the BTS point of interface component 206 is configured to provide each of the BTS signals to a splitting/combining network 210 of the master unit 202 through a respective downlink connection, such as a coaxial cable. The MIMO point of interface component 208 is similarly configured to provide the plurality of MIMO signals in the 700 MHz frequency MIMO band to the splitting/combining network 210 through a corresponding downlink connection, such as a coaxial cable. In turn, the splitting/combining network 210 is configured to split and/or otherwise combine signals from the BTS point of interface component 206 and/or MIMO point of interface component 208 for transceiving with respective remote units 204. In operation, the splitting/combining network 210 is configured to provide the Band 1-n service signals from at least one BTS, as well as the multiple MIMO signals in the 700 MHz frequency band, to optical transceiver circuitry 212 through a suitable downlink connection, such as a coaxial cable. The various optical transceiver circuits 212, in turn, provide downlink signals to respective remote units 204 through a downlink optical link, which may be an optical fiber. As is illustrated in FIG. 6A, the uplink (UL) and downlink (DL) paths are handled over separate fiber links.

Each remote unit 204 of the MIMO DAS 200 is configured to receive the optical signals from the master unit 202, convert those signals into appropriate electrical signals, transmit various of the signals for that remote unit 204 through one or more antennas 216*a*-*b*, and couple the plurality of MIMO signals in the 700 MHz MIMO frequency band to an extension unit 214 through downlink auxiliary channels for transmission on respective antennas 218*a*-*b* thereby.

In the uplink direction, the extension unit 214 receives uplink MIMO signals in the 700 MHz frequency band or other MIMO frequency band on respective antennas 218*a*-*b* and provides those signals to the remote unit 204 over the auxiliary channels or ports. The remote unit 204, in turn, receives other service signals via the antennas 216*a-b* and combines those signals with the MIMO signals from the extension unit 214. The remote unit provides them via an uplink optical link, which may be an optical fiber, to the optical transceiver 212 of the master unit 202 after appropriate conversion from electrical signals, such as using suitable optical transceiver circuitry, as noted below. The optical transceiver 212, in turn, provides the combined signals to the splitting/combining network 210 through an uplink connection, which may be a coaxial cable. The splitting combining network 210 splits the combined signals back to the MIMO point of interface 208 through an uplink connection, which may be a coaxial cable, as well as the signals for the respective BTS bands 1-n for transmission back to that BTS through the BTS point of interface component 206.

Thus, the MIMO DAS 200 operates to simultaneously transmit the signal from at least one BTS through the remote unit 204 as well as a plurality of MIMO signals in the 700 MHz frequency band or other MIMO band through the extension unit 214 using a legacy DAS communication system and additional components.

Figure 6B:
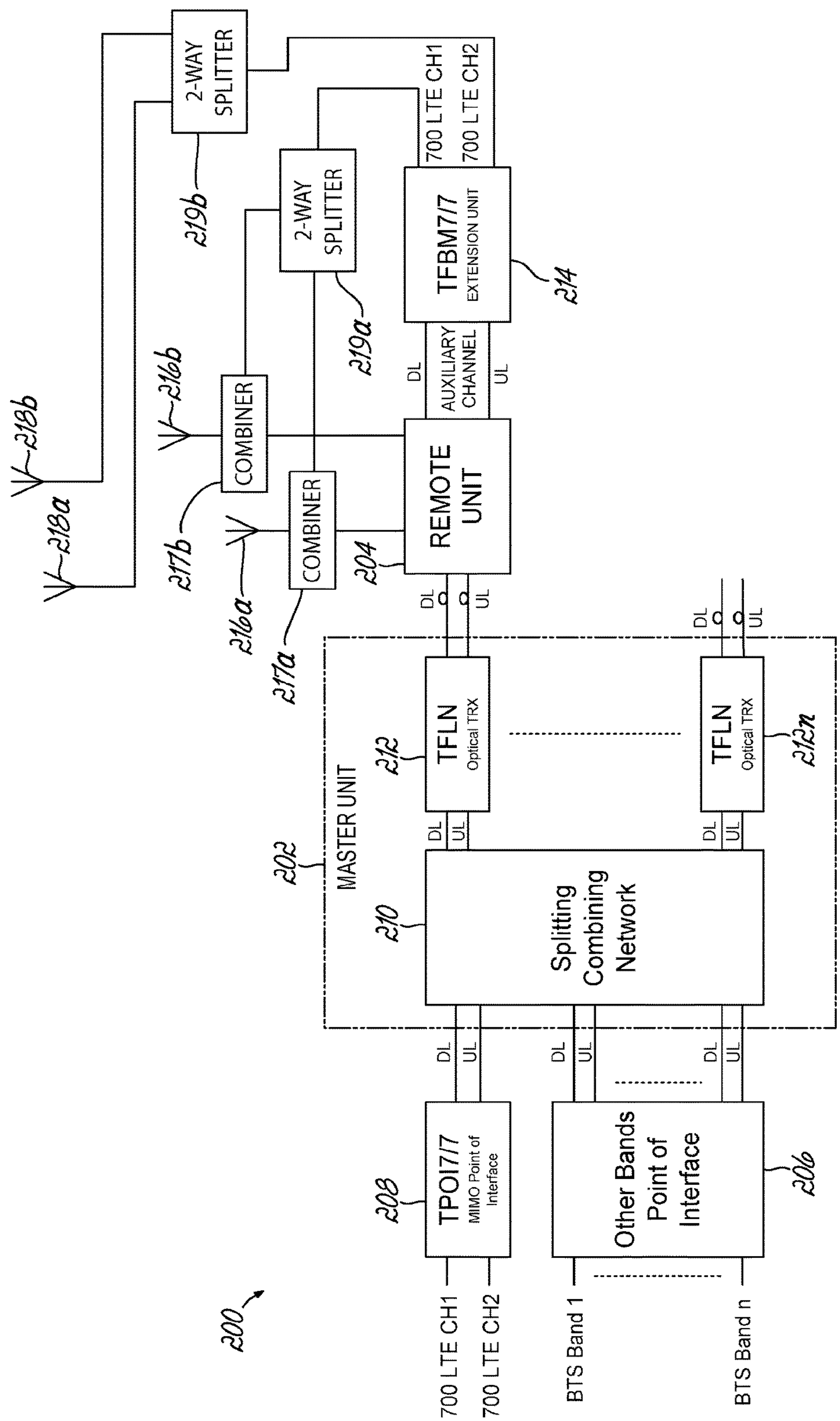
FIG. 6B is a block diagram of the converted MIMO DAS system in FIG. 6A with the addition of 2-way splitters and combiners configured so that the legacy signals share antennas with at least some of the MIMO signals consistent with embodiments of the invention.

In accordance with the aspects of the invention, the DAS 200 as illustrated in FIGS. 6A-6B also provides frequency translation or frequency conversion of a plurality of MIMO signals for maintaining the integrity of the MIMO system. All of the MIMO signals, including any additional service signals, are sent over dual fiber-optic cables. One fiber link is for the uplink signals and another fiber link is for the downlink signals. As illustrated in the FIGS. 6A, 6B, and 7A, although the downlink and uplink paths are handled over separate fiber-optic cables, all the MIMO signals in the downlink direction, as well as all of the MIMO signals in the uplink direction, are present on the same fiber-optic cable. As such, the present invention addresses the integrity of the MIMO process by providing suitable frequency conversion and frequency translation of the MIMO signals discussed herein.

Figure 7A:
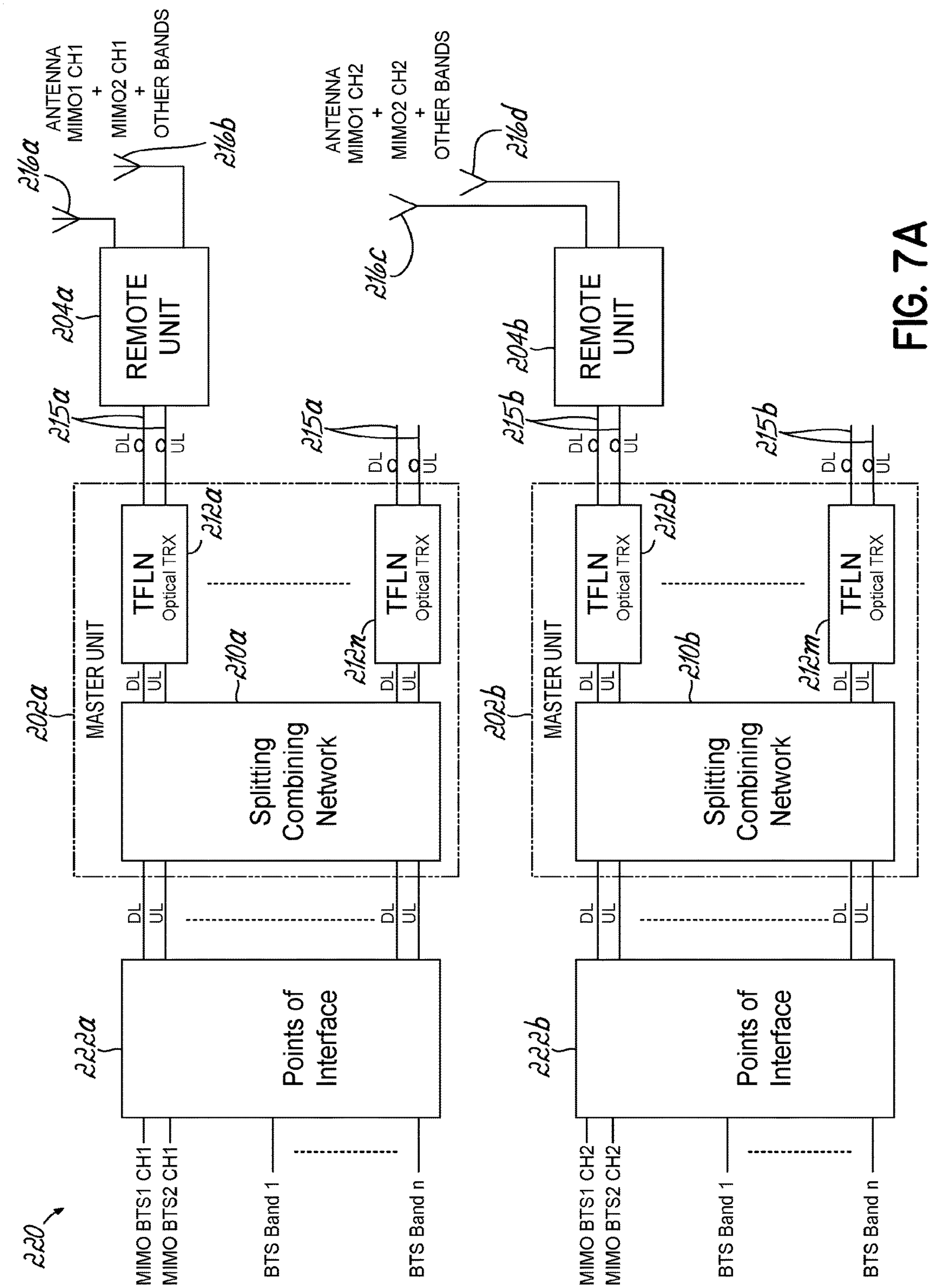
FIG. 7A is a block diagram of a legacy DAS converted to a MIMO DAS by introducing additional signals consistent with embodiments of the invention.

FIG. 6B is a diagrammatic illustration of another embodiment of the MIMO DAS 200 somewhat similar to the DAS system of FIG. 6A, except in which the signals from the remote unit 204 and the extension unit 214 are combined prior to being transmitted via the appropriate antennas 216*a-b* and/or 218*a-b*. The extension unit 214 processes the various MIMO signals, however, antennas from the remote units 204 are used for transceiving the MIMO signals, in addition to antennas coupled to the extension unit 214. As such, a combiner 217*a* and 217*b* is placed between the remote unit 204 and the respective antennas 216*a* and 216*b* of the remote unit. The combiners 217*a* and 217*b*, in turn, receive signals from a splitter 219*a* that is coupled with the extension unit 214. The other splitter 219*b* is placed between the extension unit 214 and respective antennas 218*a* and 218*b*. A first output of splitter 219*a* is provided to a first antenna 216*a* of the remote unit 204, while a second output of the splitter 219*a* is provided to the second antenna 216*b* of the remote unit 204. As for splitter 219*b*, a first output is provided to the first antenna 218*a* of the extension unit 214, while a second output is provided to the second antenna 218*b* of the extension unit 214. In this manner, the MIMO DAS 200 operates to simultaneously transmit the signals from at least one BTS service band, and one of the signals in the 700 MHz MIMO frequency band through a first antenna 216*a* of the remote unit 204, simultaneously transmit the signals from at least one BTS service band and one of the signals in the 700 MHz frequency band through a second antenna 216*b* of the remote unit 204, and simultaneously transmit another signal in the 700 MHz MIMO frequency band through the antennas 218*a* and 218*b* of the extension unit 214. As such, the MIMO transmission is shared between the remote unit and extension unit FIG. 7A is a diagrammatic illustration of another alternative embodiment of a MIMO DAS 220 that may be configured from a pre-existing SISO DAS, and in particular a DAS that does not use an extension unit for handling the MIMO signals. As such, the MIMO DAS 220 includes at least one master unit 202*a-b* for each of the multiple MIMO signals in the 700 MHz frequency band. Specifically, the MIMO DAS 220 includes a point of interface component 222*a-b* for each master unit 202*a-b* that combines multiple MIMO signals in the 700 MHz frequency band (e.g., illustrated as "MIMO BTS1 CH1," "MIMO BTS2 CH1," "MIMO BTS1 CH2," and "MIMO BTS2 CH2") with one or more other service signals from a plurality of BTSs.

In the downlink direction, for example, the point of interface component 222*a* combines a signal from a first MIMO BTS in a MIMO band, such as the 700 MHz frequency band, (e.g., MIMO BTS1 CH1) with a signal from a second MIMO BTS in a MIMO band, such as the 700 MHz frequency band (e.g., MIMO BTS2 CH1) and at least one service signal from at least one additional BTS. This combined signal is provided to the master unit 202*a* via a downlink connection, such as a coaxial cable. The master unit 202*a*, in turn, provides the combined signals, through the optical transceiver circuitry 212*a*, to remote units 204*a* over a set of uplink and downlink fiber cables for transmission by antennas 216*a-b*. Therefore, the remote units 204*a* handle one MIMO signal for the various MIMO bands MIMO BTS1 and MIMO BTS 2.

Similarly, the point of interface component 222*b* combines a signal from the first MIMO BTS in a MIMO band, such as the 700 MHz frequency band, (e.g., MIMO BTS1 CH2) with a signal from the second MIMO BTS in a MIMO band, such as the 700 MHz frequency band, (e.g., MIMO BTS2 CH2) and at least one service signal from at least one additional BTS. This combined signal is provided to the master unit 202*b* via a downlink connection, such as a coaxial cable, which in turn provides the combined signals to another set of remote units 204*b* over a separate set of uplink and downlink fiber cables for transmission by its antennas 216*c-d*. Therefore, the remote units 204*b* handle an additional MIMO signal for the various MIMO bands MIMO BTS1 and MIMO BTS2.

In that way, the segregation between various MIMO signals is maintained by implementing various master units and associated remote units, each handling a specific MIMO signal. In that way, the plurality of MIMO signals might be transmitted throughout a space, such as the inside of a building or other confined area where the DAS system might be utilized in accordance with the principles of the invention. Master unit 202*a* incorporates a set of downlink and uplink fiber-optic cables 215*a* for handling one of the MIMO signals for each of the various different MIMO services. Alternatively, the master unit 202*b* handles another of the MIMO signals of the various different MIMO services. As such, in accordance with one aspect of the invention, the segregation of the different MIMO signals, CH1 and CH2, for example, are maintained without requiring frequency conversion or frequency translation, as is utilized in various of the other embodiments of the invention disclosed herein.

Figure 7B:
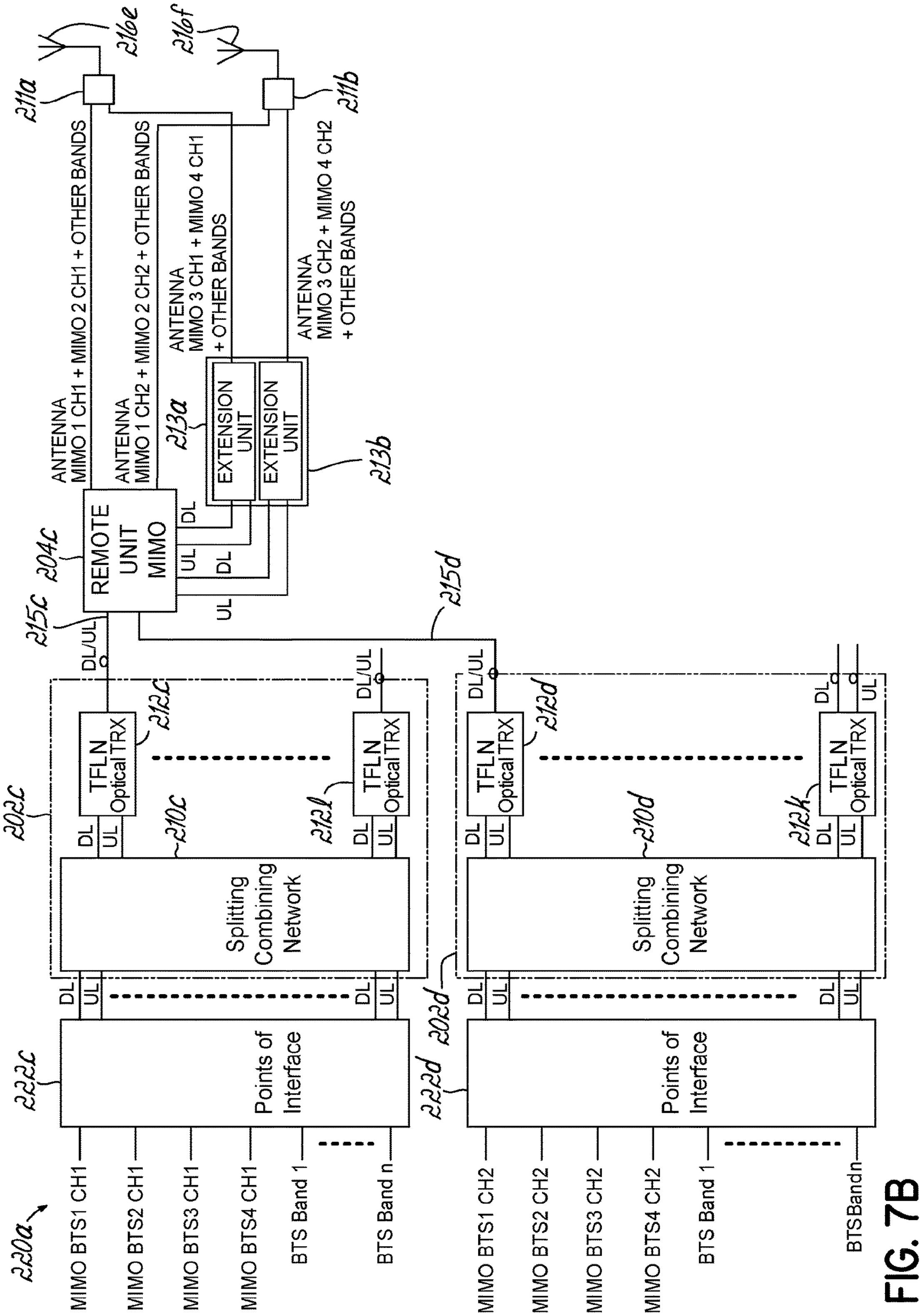
FIG. 7B is a block diagram of an alternative embodiment of a DAS system capable of handling MIMO signals.

FIG. 7B is a diagrammatic illustration of another alternative embodiment of a MIMO DAS 220*a* that may be configured from a pre-existing SISO DAS. The MIMO DAS 220*a* includes one or more extension units for handling additional MIMO signals, thereby allowing a single remote unit to accommodate more than two MIMO BTSs. In contrast to the system illustrated in FIG. 7A, which provides an optical link between a master unit and remote unit with separate uplink and downlink cables, the system in FIG. 7B is configured so that the uplink and downlink optical signals between a master unit and remote unit share a single fiber. Advantageously, this configuration may allow a legacy SISO system that uses separate fibers for uplink and downlink signals (such as those illustrated in FIGS. 6A and 6B) to handle additional MIMO signal bands, as compared to the system illustrated in FIG. 7A. The additional MIMO signals may be coupled to extension units through extension ports on a single remote unit 204*c* for transmission to existing antennas. The MIMO DAS 220*a* may thereby provide MIMO signals to the service area without the need for frequency conversion or additional optical fibers with respect to an existing legacy system having separate uplink and downlink fiber cables.

To this end, the MIMO DAS 220*a* includes separate master units 202*c-d* for each of the multiple MIMO signals in the 700 MHz frequency band. Specifically, the MIMO DAS 220*a* includes point of interface components 222*c-d* for each of the separate master units 202*c-d*. The point of interface components 222*c-d* are coupled to appropriate sources of communication signals, such as one or more BTSs, and combine multiple MIMO signals in the 700 MHz frequency band (e.g., illustrated as "MIMO BTS1 CH1," "MIMO BTS2 CH1," "MIMO BTS3 CH1," "MIMO BTS4 CH1," "MIMO BTS1 CH2," "MIMO BTS2 CH2," "MIMO BTS3 CH2," and "MIMO BTS4 CH2") with one or more other service signals (BTS Band 1-n) from one or more BTSs.

In the downlink direction, for example, the point of interface component 222*c* combines signals from four MIMO BTSs in chosen MIMO bands, such as the 700 MHz frequency band and other bands (e.g., MIMO BTS1 CH1, MIMO BTS2 CH1, MIMO BTS3 CH1, and MIMO BTS4 CH1), with at least one service signal from at least one additional BTS (BTS Band). This combined signal is provided to the master unit 202*c* via a downlink connection, such as a coaxial cable. The master unit 202*c*, in turn, provides the combined signals, through the optical transceiver circuitry 212*c*, to a remote unit 204*c* over a single fiber cable 215*c* for transmission by antennas 216*e-f*. To reduce the total number of fiber cables required, the downlink signal shares the fiber cable 215*c* with its associated uplink signal. To this end, the uplink and downlink signals are multiplexed in optical units at either end of the fiber using appropriate combining or multiplexing circuitry, such as illustrated in FIGS. 2B, 3B, and 4B.

Similarly, the point of interface component 222*d* combines signals from the four MIMO BTSs in a MIMO band, such as the 700 MHz frequency band, (e.g., MIMO BTS1 CH2, MIMO BTS2 CH2, MIMO BTS3 CH2, and MIMO BTS4 CH2) with at least one service signal from at least one additional BTS. This combined signal is provided to the master unit 202*d* via a downlink connection, such as a coaxial cable, which in turn provides the combined signals to remote unit 204*c* over a separate fiber cable 215*d* for transmission by antennas 216*c-d*. Therefore, the MIMO DAS 202*a* handles the additional MIMO signals or Channel 2 signals for the various MIMO bands MIMO BTS1, MIMO BTS2, MIMO BTS3, and MIMO BTS 4 by utilizing a second fiber (which may have served as an uplink fiber in the legacy SISO system) to deliver MIMO CH2 signals from the plurality of BTSs. The remote unit 204*c* receives the various different MIMO signals and processes and directs those signals appropriately for the interface. Because the Channel 1 and Channel 2 MIMO signals are handled over separate fiber links, the MIMO information on those channels remains intact without frequency translation and segregation. The remote unit 204*c* communicates MIMO BTS1 CH1 and CH2; and MIMO BTS2 CH1 and CH2, and other appropriate signal bands over antennas 216*e* and 216*f*.

The additional MIMO signals in the downlink direction originating from the third and fourth MIMO BTSs in the MIMO band (e.g., MIMO BTS3 CH1, MIMO BTS4 CH1, MIMO BTS3 CH2, MIMO BTS4 CH2) are received by the remote unit 204*c* and communicated through extension or auxiliary ports to extension units 213*a-b* for transmission by antennas 216*e*, 216*f*. To accommodate these additional MIMO signals, the remote unit 204*c* may include one or more extension ports each configured to accept connections from an extension unit 213*a-b*. When the extension units 213*a-b* are coupled to the remote unit 204*c* via the extension ports, additional separate uplink and downlink paths are provided through the remote unit 204*c* to the various extension units. The multiple extension units might be configured to handle separate MIMO channels, as shown for the MIMO 3 and MIMO 4 bands. For example, extension unit 213*a* handles Channel 1 signals for the additional bands, and extension unit 213*b* handles Channel 2 signals.

Segregation between various MIMO signals is thereby maintained by implementing various master units and associated extension units coupled by a single remote unit. The remote unit handles transmission of the MIMO signals from the first and second MIMO BTSs, and the extension units each handle specific MIMO channel signals from the third and fourth MIMO BTS's. Each of the MIMO antennas 216*e, f* are coupled with the remote unit and extension units to handle the Channel 1 and Channel 2 signals respectively for multiple MIMO services. In that way, the plurality of MIMO signals may be transmitted throughout a space, such as the inside of a building or other confined area where the DAS system may be utilized in accordance with the principles of the invention. Master unit 202*c* utilizes one fiber-optic cable 215*c* for handling the uplink and downlink signals for one of the MIMO channel signals for each of the various different MIMO services; and master unit 202*d* utilizes a second fiber-optic cable 215*d* for handling the other of the MIMO channel signals. Additional master units may be added as required to handle additional MIMO BTSs, with corresponding extension units 213*a-b* coupling the additional MIMO signals to the antennas 216*e-f* through signal combiners 211*a-b*. As such, in accordance with one aspect of the invention, the segregation of the different MIMO signals, CH1, CH2 for example, is maintained without requiring frequency conversion or frequency translation, as is utilized in various of the other embodiments of the invention disclosed herein.

Figure 8:
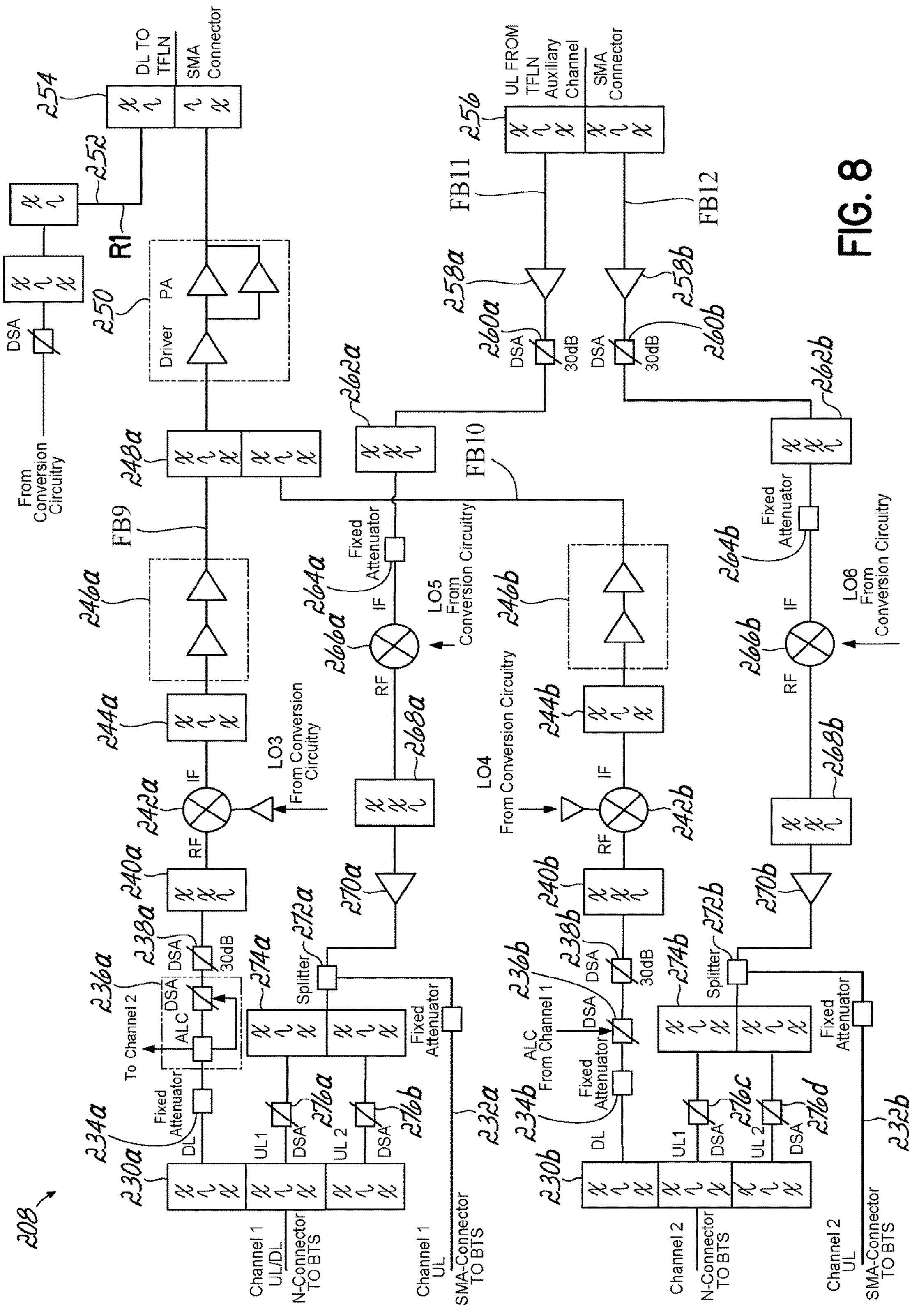
FIG. 8 is a block diagram of the MIMO point of interface component of FIGS. 6A-6B.

FIG. 8 is a diagrammatic illustration of at least a portion of the MIMO point of interface component 208 that may be used within the MIMO DAS 200 of FIGS. 6A, 6B. Returning to FIG. 8, the MIMO point of interface component 208 processes the various MIMO signals in the MIMO band, such as a 700 MHz frequency band, in much the same way, apart from the frequencies to which they are converted/translated and combined in the end.

More specifically, the MIMO point of interface is coupled with the master unit in DAS 200 such that the interface circuit 208 handles the frequency conversion or translation rather than the master unit, and thus delivers the frequency converted MIMO signals to the master unit to then be forwarded to the various remote units. For the purposes of discussion, the different MIMO signals will be referred to as Channel 1 or CH1 and Channel 2 or CH2. As discussed above, while a 2×2 MIMO arrangement is disclosed and discussed herein, additional MIMO arrangements might be utilized, and therefore, there may be additional MIMO signals such as CH3, CH4, etc. In accordance with the invention, those signals would have to be handled in a similar fashion to provide the desirable frequency conversion and/or separate handling of the various MIMO channel signals to maintain the integrity of the MIMO process.

As such, the MIMO point of interface component 208 is configured to accept both duplexed or un-duplexed signals. In the case of duplexed signals, the signals are processed through a respective duplexer circuitry, such as triplexers 230 (230*a* and 230*b*) that separate the downlink MIMO signals from uplink MIMO signal sub-bands. When the signals are not duplexed, the downlink (DL) signal is processed through a respective triplexer 230 with the uplink (UL) signal sub-bands connected to a respective separate connector 232 (232*a* and 232*b*).

With respect to the downlink path, the MIMO channel signals are attenuated by a fixed amount with an attenuator 234 (234*a*, 234*b*) then processed through two digital attenuators 236 (236*a*, 236*b*) and 238 (238*a*, 238*b*), one of which 236 is responsible for automatic level control ("ALC") and the other of which 238 is used to adjust the gain (e.g., in the 30 dB range, in 1 dB steps). A filter 240 (240*a* and 240*b*) filters the respective channel signals. The signals are then mixed with an appropriate LO reference in a respective mixer 242 (242*a* and 242*b*) to produce respective frequency converted signals. As illustrated in FIG. 8, the signal of the first MIMO channel CH1 is mixed by mixer 242*a* with an LO reference at a third LO frequency LO3. The signal of the second MIMO channel CH2 is mixed by mixer 242*b* with an LO reference at a fourth LO frequency LO4. As such, in the embodiment of FIG. 8, the MIMO signals CH1, CH2 are converted into a ninth frequency band FB9 (CH1) and a tenth frequency band FB10 (CH2). The frequency converted signals are filtered again with a respective filter 244 (244*a* and 244*b*), and amplified by respective amplification circuits 246 (246*a* and 246*b*). After amplification, the two downlink signals CH1 and CH2 are combined in a duplexer 248*a*. The combined signal is then further amplified by amplifier circuit 250 before being combined with another attenuated and filtered frequency reference as at 252 by duplexer 254. The MIMO point of interface component 208 then provides the combined signals to the master unit 202 as described above.

In the uplink (UL) direction, the MIMO uplink signals from the master unit 202 are split appropriately into two signals by a duplexer 256. For example, the MIMO signals from the various remote units might be in an eleventh frequency band FB11 and a twelfth frequency band FB12. As noted above, the MIMO uplink signals may be in various sub-bands of FB11, FB12. Each signal is then filtered by a respective filter 258 (258*a* and 258*b*), attenuated by a respective attenuator 260 (260*a* and 260*b*), filtered again by respective filter 262 (262*a* and 262*b*), and again attenuated by respective attenuator 264 (264*a* and 264*b*). Each signal is then frequency converted by a respective mixer 266 (266*a* and 266*b*). In particular, the signal on the first channel is mixed by mixer 266*a* with an LO reference at a fifth LO frequency LO5, while the signal on the second channel is mixed by a mixer 266*b* with an LO reference at a sixth LO frequency LO6. This yields MIMO uplink signals in the original MIMO uplink band. In any event, the frequency converted signals are filtered by a respective filter 268 (268*a* and 268*b*), and amplified by a respective amplifier 270 (270*a* and 270*b*) prior to being provided back to a MIMO BTS as described above.

In particular, the signals in the uplink direction are split by respective splitter 272 (272*a* and 272*b*) and duplexed into respective MIMO uplink sub-bands by respective duplexer 274 (274*a* and 274*b*). Each sub-band is attenuated by respective attenuator 276 (276*a*-276*b*) then combined with the downlink signals by the respective duplexer circuits 230. Alternatively, the signals in the uplink direction are provided directly back to the respective MIMO BTSs via the respective connectors 232.

Figure 9:
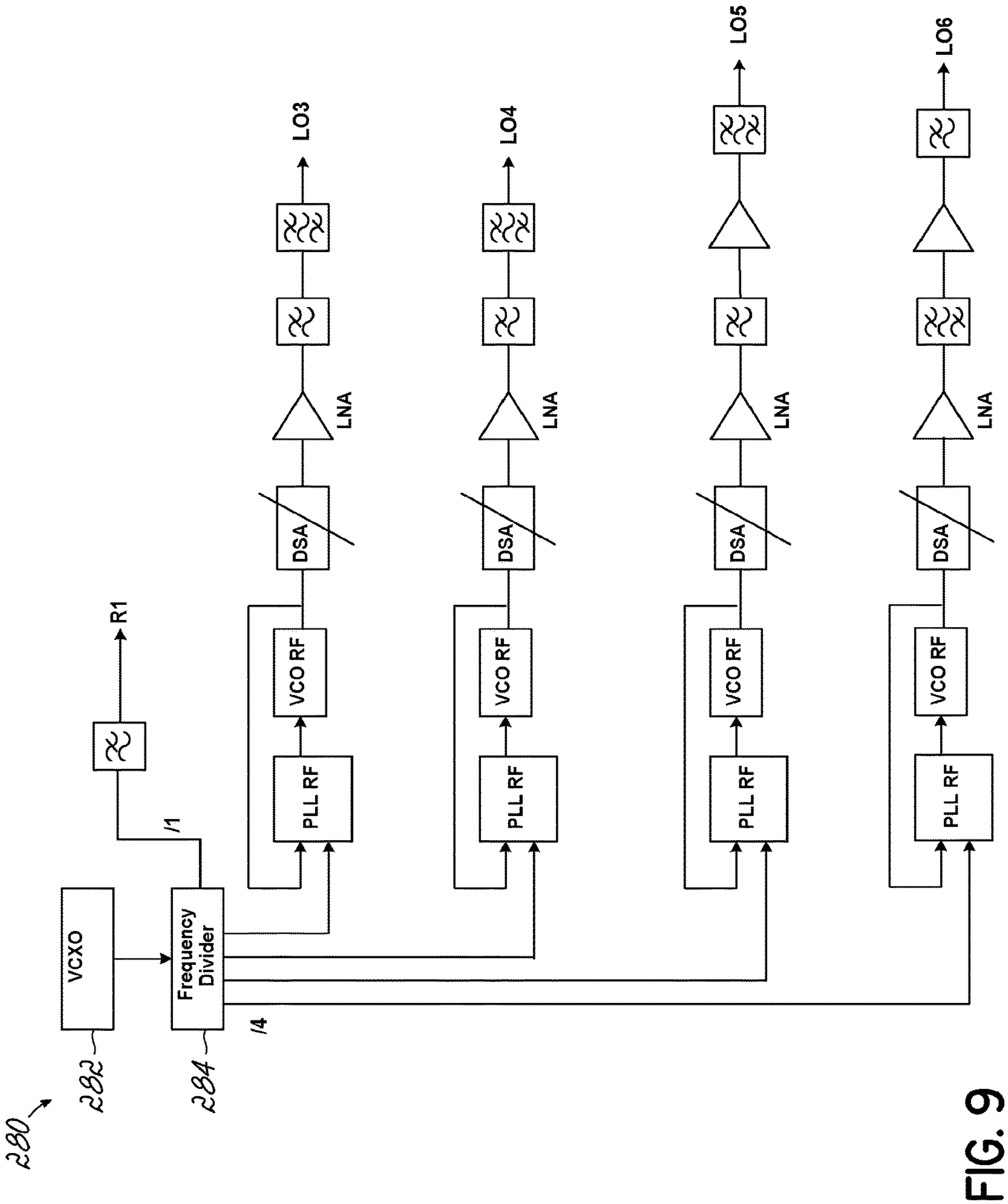
FIG. 9 is a block diagram of frequency conversion circuitry that may be used in the MIMO point of interface component of FIG. 8.

FIG. 9 is a diagrammatic illustration of frequency conversion circuitry 280 that may be used inside the MIMO point of interface component 208 for providing desirable LO's or other frequency references for frequency conversion. A voltage controlled crystal oscillator 282 provides a reference frequency signal, such as a signal at a first reference frequency R1. A frequency divider 284 produces stabilized reference signals that are subsequently filtered. The frequency divider 284 further divides the reference frequency signal into additional paths to generate the reference signals for the synthesizers of the LO references for the MIMO point of interface component 208. The reference signals are level adjusted, amplified, and/or filtered, as necessary. In specific embodiments, the frequency conversion circuitry 280 produces a frequency reference at frequency R1 and LO references at frequencies LO3, LO4, LO5, and LO6.

Figure 10:
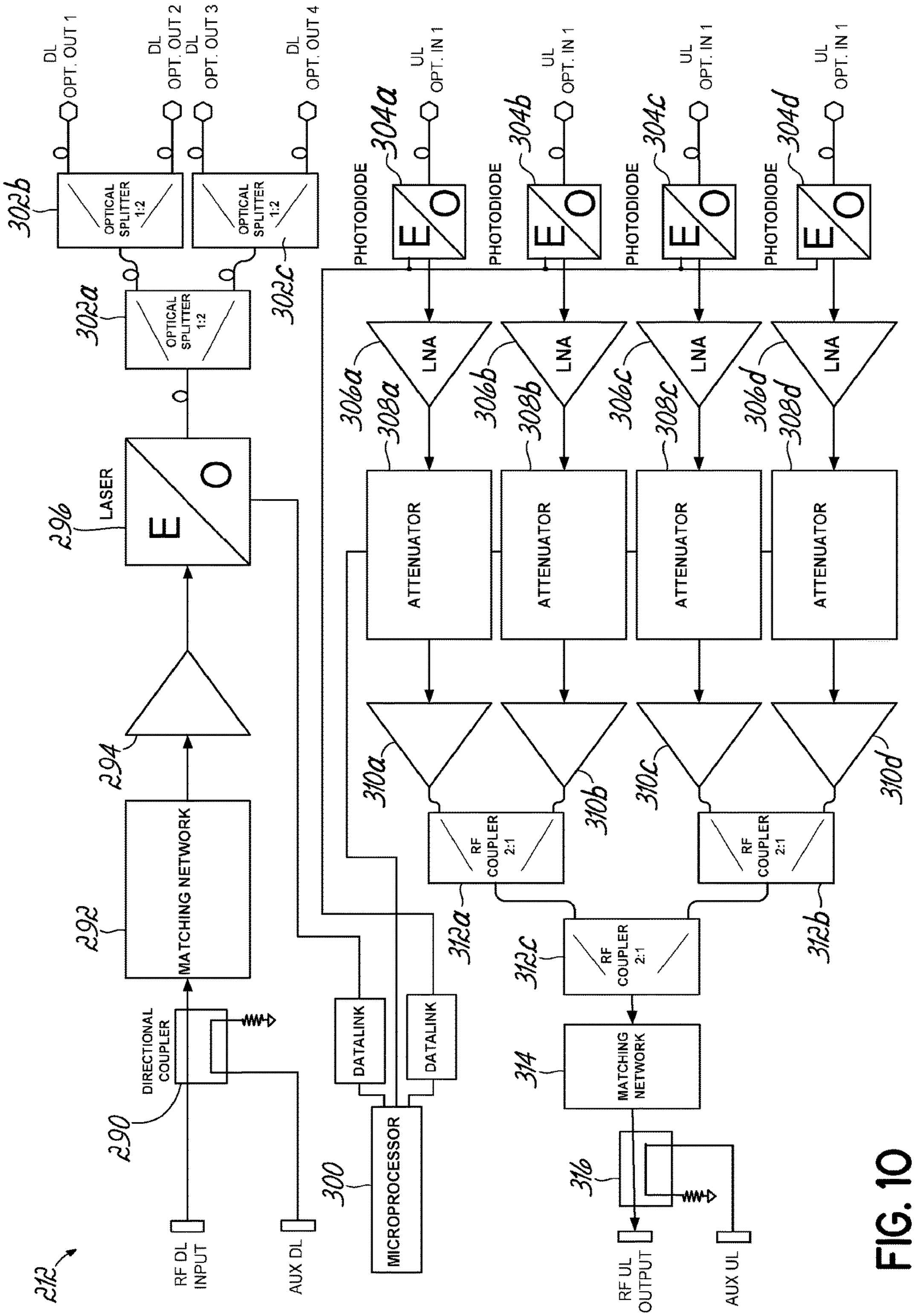
FIG. 10 is a block diagram of an optical transceiver that may be used in the MIMO DAS of FIG. 6A, 6B, 7A, or 7B.

FIG. 10 is a diagrammatic illustration of at least a portion of optical transceiver circuitry 212 that may be used with the MIMO DAS 200 of FIGS. 6A, 6B, or the MIMO DAS 220 of FIG. 7A, or 7B. Returning to FIG. 10, the optical transceiver circuitry 212 includes main channel and auxiliary downlink inputs, as well as main channel and auxiliary uplink inputs. In the downlink direction, the signal received on the main channel downlink input is combined with any signal received on the auxiliary downlink input in a directional coupler 290, processed through a matching network 292, amplified in amplifier 294, and converted to an optical signal by an electrical-to-optical circuit 296. The optical signal may then be split by a series of optical splitters 302*a*-*c* to output various outputs, such as to one of four optical outputs. The outputs include the signals combined from the main channel and auxiliary downlink inputs. The downlink signals are provided by appropriate downlink optical links, such as fiber-optic cables, to remote units 204. As illustrated in FIG. 10, the optical transceiver 212 may include a microprocessor 300 to control its operation.

In the uplink direction, signals received from the remote units 204 on suitable optical links, such as fiber-optic cables, provide various (e.g., one of four) inputs that are converted from an optical signal to an electrical signal by a respective electrical-to-optical circuit 304 (304*a*-*d*). The signals are amplified by a respective amplifier 306 (306*a*-*d*), and attenuated by a respective attenuator 308 (308*a*-*d*). The signals are then amplified by another respective amplifier 310 (310*a*-*d*). Each of the uplink signals received is then combined by a series of RF couplers 312*a*-*c*, processed through a matching network 314, and split between the corresponding main channel and auxiliary uplink inputs for transmission to the splitting/combining network 210 of the master unit.

Figure 11:
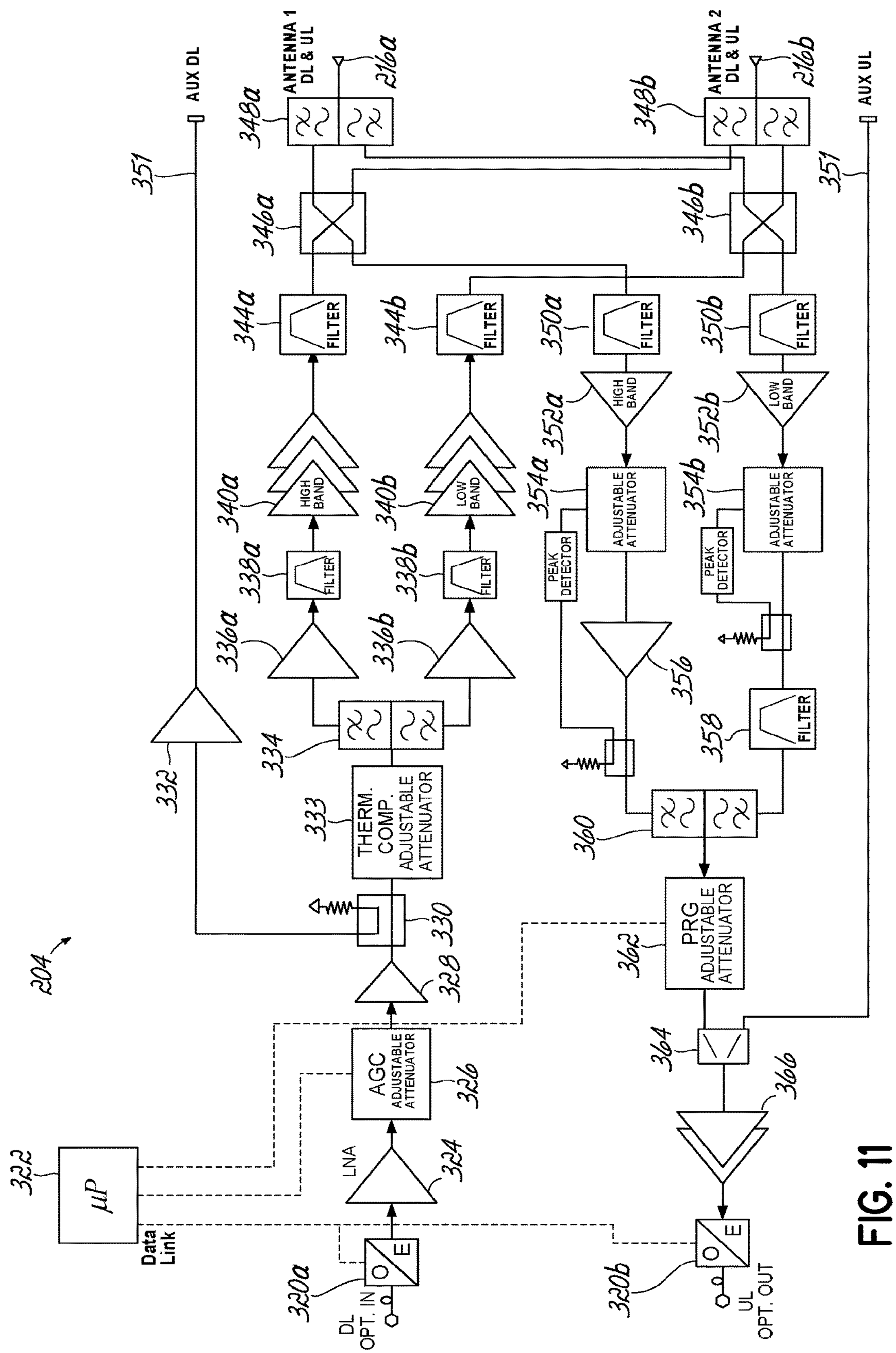
FIG. 11 is a block diagram of a remote unit that may be used in the MIMO DAS of FIG. 6A, 6B, 7A, or 7B.

FIG. 11 is a diagrammatic illustration of at least a portion of a remote unit 204 that may be used with the MIMO DAS 200 of FIGS. 6A-6B, or the MIMO DAS 220 of FIGS. 7A-7B. The remote unit 204 couples with a master unit over multiple fiber-optic cables, one dedicated for the uplink traffic, and another for the downlink traffic. In the downlink direction, the remote unit 204 receives an optical signal across a downlink optical connection and converts that signal to an electrical signal using an electrical-to-optical circuit 320*a* under control of a suitable microprocessor 322. The electrical signal is then amplified by an amplifier 324 and attenuated by an adjustable automatic gain control attenuator 326 also under control of the microprocessor 322. The attenuated signal is again amplified by an amplifier 328. In accordance with one aspect of the invention, the signal is split into separate signals for the remote unit 204 and for an extension unit 214 using a directional coupler 330.

The directional coupler 330 separates the main signal for the remote unit 204 to include an auxiliary signal for provision to an auxiliary signal port 351 in the remote unit. An extension unit 214 is coupled to the auxiliary port 351. Thus, the auxiliary signal is amplified by an amplifier 332 then provided to extension unit 214. The main signal, in turn, is attenuated by an adjustable attenuator 333, which may compensate for temperature variances, and duplexed by a duplexer 334 into its high frequency and low frequency band components, such as a signal in the 1900 MHz frequency band (e.g., a "high" band) and a signal in the 850 MHz frequency band (e.g., a "low" band). The high and low band signals are amplified by respective amplifiers 336 (336*a* and 336*b*), filtered by respective filters 338 (338*a* and 338*b*), and again amplified by respective high or low band amplifiers 340 (high band amplifier 340*a* and low band amplifier 340*b*). The high and low band signals are then filtered via a respective filter 344 (344*a* and 344*b*), and coupled to each antenna 216*a-b* via a respective coupler 346 (346*a* and 346*b*). The high and low band signals combined by respective duplexers 348 (348*a* and 348*b*) for transmission on a plurality of antennas 216*a-b* of that remote unit 204. Thus, the remote unit 204 simultaneously provides the high and low band signals for each antenna 216*a-b*.

In the uplink direction, the signals from the antennas 216*a-b* are separated by the duplexers 348*a-b* and couplers 346*a-b* into their respective high and low band signals. Each of the high and low band uplink signals is then filtered by a respective filter 350 (350*a* and 350*b*), amplified by a respective amplifier 352 (high band amplifier 352*a* and low band amplifier 352*b*), and attenuated by a respective adjustable attenuator 354 (354*a* and 354*b*), which may adjust the gain of the respective band. The high band signal is then amplified by an amplifier 356 while the low band signal is filtered by a filter 358. The high and low band signals are then combined into a common uplink signal via a duplexer 360. The uplink signal is attenuated by a programmable and adjustable attenuator 362 that is controlled by the microprocessor 322. The signals handled by the remote unit are then combined with any auxiliary signals from the extension unit 214 by a combiner 364. The combined uplink and auxiliary signal is then amplified by an amplifier 366 before being converted into an optical signal by an electrical-to-optical circuit 320*b* for being directed to a master unit over the fiber link.

As discussed above with respect to FIGS. 6A and 6B, for implementing a MIMO service within an existing DAS system, an extension unit might utilized and coupled with the remote unit for handing one or more of the plurality of MIMO signals. Such an extension unit is coupled with the remote unit, such as through an auxiliary port that has individual uplink and downlink connections, as illustrated. Such a connection might be made using a suitable link, such as a coaxial cable link.

Figure 12:
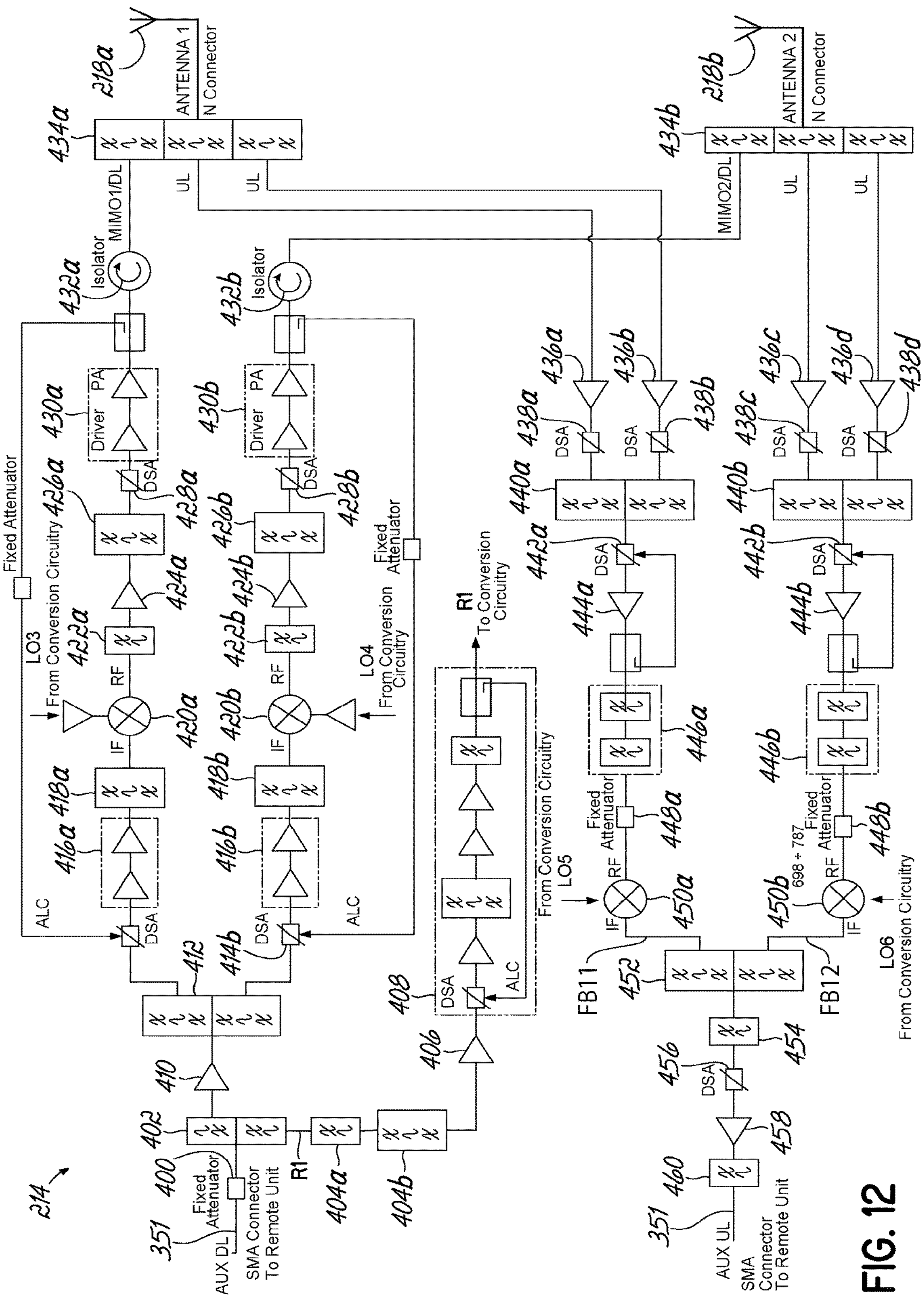
FIG. 12 is a block diagram of an extension unit that may be used in the MIMO DAS of FIG. 6A, 6B, 7A, or 7B.

FIG. 12 is a diagrammatic illustration of an extension unit 214 that may be used with the MIMO DAS 200 of FIGS. 6A-6B, or the MIMO DAS 220 of FIGS. 7A-7B. In FIG. 12, the downlink signal coming into the extension unit 214 is attenuated by attenuator 400 and duplexed by duplexer 402 to separate the main signal from any frequency reference that might be utilized for the frequency conversion of the MIMO signals. The frequency reference is then filtered by filters 404*a-b*, amplified by amplifier 406, and level controlled through an automatic level control circuit 408 prior to use for signal frequency conversion.

The downlink signal, however, is amplified by amplifier 410 then duplexed by duplexer 412 into the multiple MIMO signals, such as the two MIMO signals corresponding to those provided to the MIMO point of interface component 208 and/or point of interface component 222. Each signal is level adjusted via another respective automatic level control component 414 (414*a* and 414*b*), amplified by a respective amplification circuit 416 (416*a* and 416*b*), filtered by a respective filter 418 (418*a* and 418*b*), and frequency converted with a respective active mixer 420 (420*a* and 420*b*). In particular, the signal on the first channel (e.g., the signal in the ninth frequency band FB9) is mixed by active mixer 420*a* with an LO reference at the third LO frequency LO3 and frequency converted to a range of the MIMO downlink band. The signal on the second channel (e.g., the signal the tenth frequency band FB10) is mixed by active mixer 420*b* with an LO reference at the fourth LO frequency LO4, and frequency converted to the MIMO downlink band. Each frequency converted signal is then filtered by a respective filters 422 (422*a* and 422*b*), amplified by a respective amplifier 424 (424*a* and 424*b*), filtered by another respective filter 426 (426*a* and 426*b*), attenuated by a respective attenuator 428 (428*a* and 428*b*), and amplified by a respective amplification circuit 430 (430*a* and 430*b*) before being isolated via a respective isolator 432 (432*a* and 432*b*) and duplexed with uplink signals via a respective duplexer 434 (434*a* and 434*b*). The isolators 432*a-b* provide adequate matching between the output of each amplification circuit 430*a-b* and the antennas 218*a-b*.

The MIMO signals might then be directed to appropriate antennas for providing an air interface for the signals. As illustrated in the embodiment of FIG. 6A, the extension unit 214 might handle the MIMO signals exclusively with the antennas coupled to the extension unit. Alternatively, as illustrated in FIG. 6B, MIMO signals might be directed from the extension unit to other antennas, such an antennas coupled to the remote unit 204. In accordance with MIMO principles, it is desirable to transmit the MIMO downlink signals over separate antennas to provide the advantages of a MIMO scheme.

In the uplink direction, each signal received from the antennas 218*a-b* is separated into uplink bands or sub-bands by the respective duplexers 434*a-b*. Each sub-band is amplified by a respective amplifier 436 (436*a-d*) and attenuated by a respective attenuator 438 (438*a-d*). The uplink sub-bands from the first antenna 218*a* are combined by duplexer 440*a*, while the uplink sub-bands from the second antenna are combined by duplexer 440*b*. The respective combined uplink signals then have their levels adjusted via a respective level control component 442 (442*a* and 442*b*) and are amplified by a respective amplifier 444 (444*a* and 444*b*), filtered by a respective filter circuit 446 (446*a* and 446*b*), and attenuated by a respective attenuator 448 (448*a* and 448*b*). The combined signals are then frequency converted by a respective mixer 450 (450*a* and 450*b*). In particular, the signal on the first channel is mixed by active mixer 450*a* with an LO reference at the fifth LO frequency LO5 and frequency converted to the eleventh frequency band FB11, while the signal on the second channel is mixed by active mixer 450*b* with an LO reference of at the sixth LO frequency LO6, and thereby frequency converted into the twelfth frequency band FB12. The frequency converted signals are then duplexed together by duplexer 452. The duplexed signal is then filtered by filter 454, attenuated by attenuator 456, amplified by amplifier 458, attenuated by attenuator 460, and provided to a respective remote unit 204 over an auxiliary uplink (UL) path in an auxiliary port.

Figure 13:
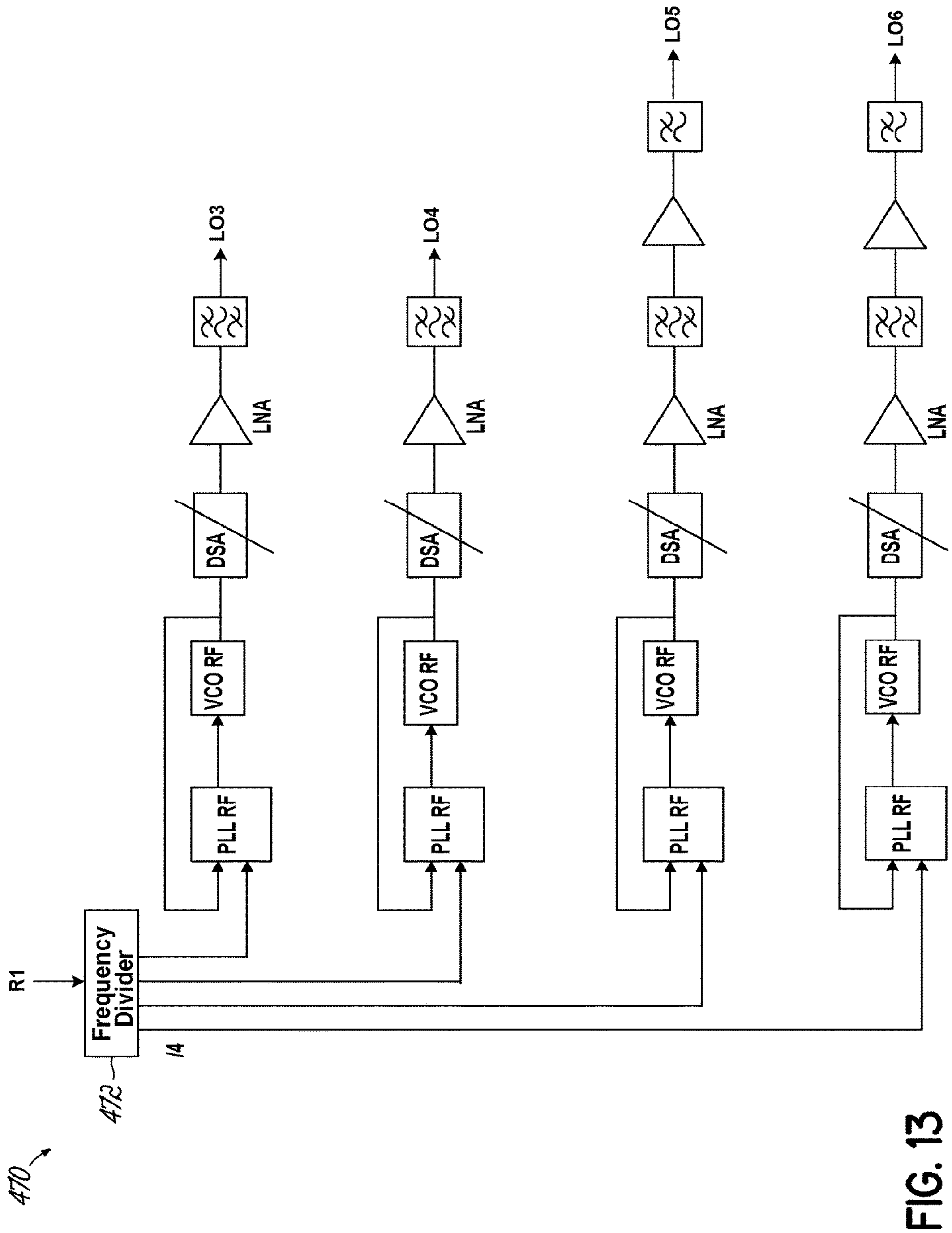
FIG. 13 is a block diagram of frequency conversion circuitry that may be used in the extension unit of FIG. 12.

FIG. 13 is a diagrammatic illustration of frequency conversion circuitry 470 that may be used with the extension unit 214. In particular, a frequency reference filtered from the downlink path (e.g., a frequency reference having a frequency of R1) is provided to a frequency divider 472 which divides the frequency reference by four to generate the references for the synthesizers of the LO references for the extension unit 214, each of which is level adjusted, amplified, and/or filtered, as necessary. In specific embodiments, the frequency conversion circuitry 470 produces reference signals of LO3, LO4, LO5, and LO6.

Figure 14:
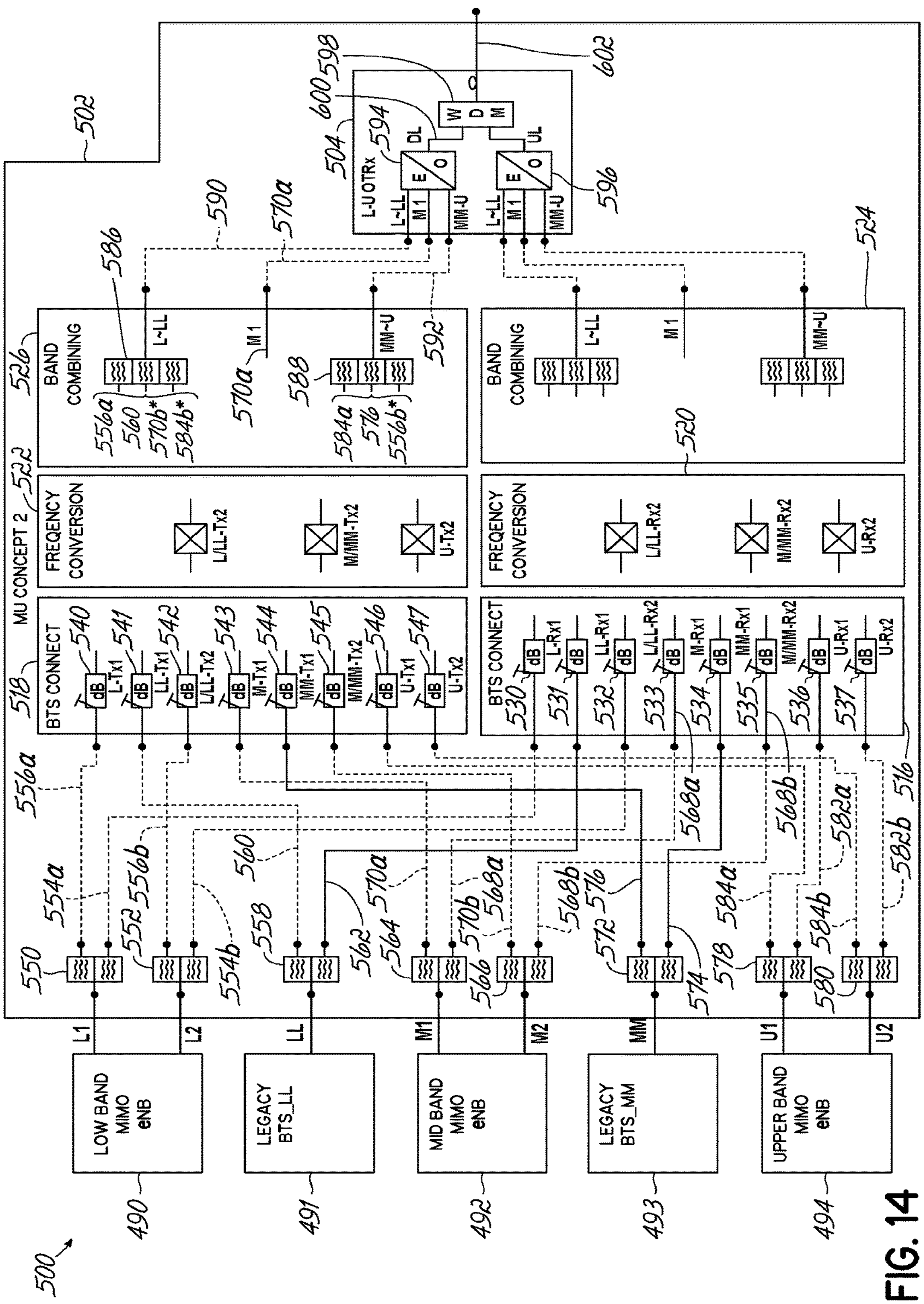
FIG. 14 is a block diagram of a DAS system and master unit in accordance with an alternative embodiment of the invention.
Figure 15:
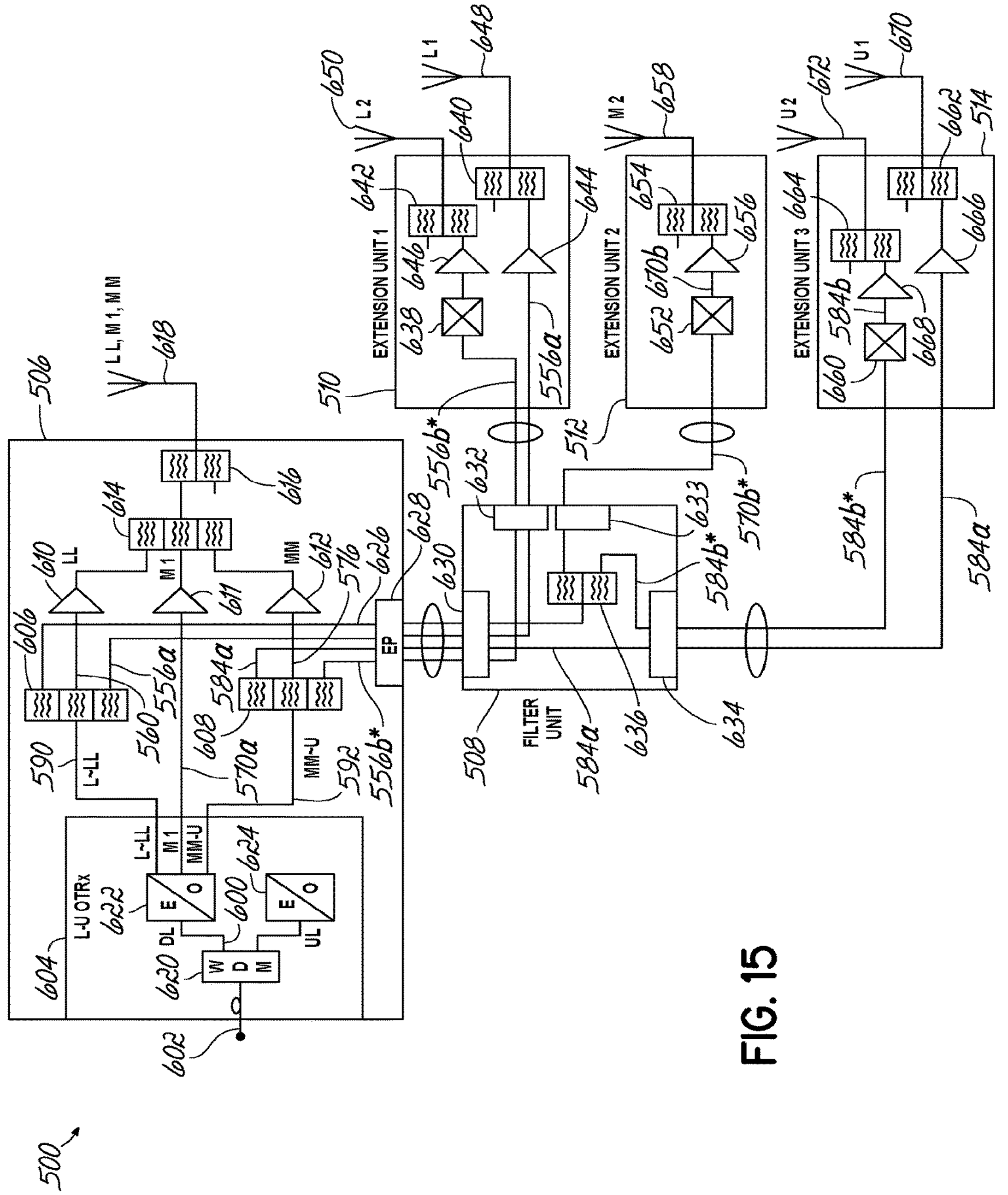
FIG. 15 is a block diagram of the DAS system of FIG. 14 illustrating the DL path of a remote unit and extension units for such a system.

FIGS. 14-15 together present an exemplary embodiment of the distributed antenna system (DAS) 500 that provides broadband coverage to an extended service area. The DAS 500 is configured to accommodate multiple bands having both MIMO and SISO signals so that the extended service area is provided with coverage from a plurality of service providers and/or broadband services operating in different bands over one single transport media, such as an optical fiber 602. Such signals are provided by one or more BTS's. For the purposes of clarity, the description of FIGS. 14-15 is limited to the downlink signal paths. However, persons having ordinary skill in the art will understand that each downlink path has an associated uplink path which is provided in essentially the same manner using similar frequency conversions and sharing the same signal links.

Referring now to FIG. 14, the DAS 500 includes one or more master units 502 that interface with a plurality of service signals 490-494 such as from one or more base station transceivers (BTSs), an optical module 504 that couples the outputs of the master unit 502 to one or more remote units 506 over fiber-optic links, and a filter unit 508 that couples the outputs of the remote units 506 to a plurality of extension units, such as, for example three extension units 510, 512, 514. The master units 502 include uplink and downlink BTS connection modules 516, 518, frequency conversion modules 520, 522, and band combining modules 524, 526. Each of the uplink and downlink BTS connection modules 516, 518 includes a plurality of radio frequency (RF) signal attenuators 530-537 and 540-547, which couple uplink signals from the DAS 500 back to the signal sources or BTSs 490-494 and downlink signals from the signal sources or BTSs 490-494 to the DAS 500, respectively.

The plurality of BTSs 490-494 may include BTSs operating in different frequency bands and supporting different air interfaces. A low-band BTS 490 transmits and receives low-band MIMO (L-MIMO or L1/L2) signals over the evolved NodeB (eNB) air interface and operates in the 800 MHz band. To support MIMO, the low-band BTS 490 has two outputs or channels, with the first output providing a L-MIMO-1 or L1 signal and the second output providing an L-MIMO-2 or L2 signal. As noted, although a 2×2 MIMO scheme is shown in the examples illustrated, the invention is not so limited to such a MIMO scheme.

A low-band legacy BTS 491 transmits and receives GSM signals in the 900 MHz band. The LL-BTS 491 of the exemplary embodiment does not support MIMO, and thus has a single output.

A mid-band BTS 492 transmits and receives mid-band MIMO (M-MIMO) signals over the eNB air interface and operates in the 1800 MHz band. As with the low-band BTS 490, the mid-band BTS 492 has two outputs or channels, with the first output providing an M-MIMO-1 or M1 signal and the second output providing an M-MIMO-2 or M2 signal.

A mid-band legacy BTS 493 transmits and receives mid-band Universal Mobile Telecommunications System (MM-UMTS) signals in the 2100 MHz band. As with the low-band legacy BTS 491, the mid-band legacy BTS 493 of the exemplary embodiment does not support MIMO, and thus has a single output.

An upper-band BTS 494 transmits and receives upper-band MIMO (U-MIMO) signals over the eNB air interface and operates in the 2600 MHz band. As with the low-band and mid-band BTSs 490, 492, the upper-band BTS 490 has two outputs or channels, with the first output providing a U1 or U1 signal and the second output providing a U-MIMO-2 or U2 signal.

The low band L1 and L2 signals from the low-band BTS 490 are coupled to the master unit 502 by duplexers 550, 552, which separate the L-MIMO signals into a uplink signals 554*a*, 554*b* and downlink signals 556*a*, 556*b*. The L1 and L2 downlink signals pass through signal attenuators 540 and 542, respectively, which couple a portion of the downlink signals to the downlink frequency conversion module 522. While embodiments of the invention herein provide frequency translation for all the MIMO signals, the embodiment in FIGS. 14 and 15 provide a translation of only one of the signals. The downlink frequency conversion module 522 provides the L1 downlink signal 556*a* to the band combining module 526 relatively unaltered or at its original frequency. However, to preserve the information contained in the L2 downlink signal 556*b*, the L2 downlink signal 556*b* is frequency shifted by a first appropriate shift frequency amount SF1, so that the shifted L2 downlink signal 556*b is frequency shifted from an original frequency to a different frequency such as into a thirteenth frequency band FB13. For consistency with respect to the other described embodiments, the different bands used for frequency shifting are numbered consecutively, but that does not mean that as between different embodiments the bands must be unique. Rather, an appropriate frequency band is chosen so as to provide the desired signal segregation in accordance with the invention. The L1** and shifted (as designated with an *) L2 downlink signals 556*a*, 556*b are provided to the downlink band combining module 526** where they are combined with other downlink signals as described in more detail below.

In a similar fashion as described with respect to the low-band BTS signals 554, 556, the LL-GSM signal from the low-band legacy BTS 491 is a non-MIMO signal, such as a SISO signal, and is coupled to the master unit 502 by duplexer 558, which separate the LL-GSM signal into a downlink signal 560 and an uplink signal 562. The LL-GSM downlink signal 560 passes through signal attenuator 541, which couples a portion of the downlink signal 560 to the downlink frequency conversion module 522. The downlink frequency conversion module 522 provides the LL-GSM downlink signal 560 to the band combining module 526 relatively unaltered or unshifted or at the original frequency, where it is combined with other downlink signals.

The M-MIMO-1 (M1) and M-MIMO-2 (M2) signals from the mid-band BTS 492 are coupled to the master unit 502 by duplexers 564, 566, which separate the M-MIMO signals into uplink signals 568*a*, 568*b* and downlink signals 570*a*, 570*b*. The M1 and M2 downlink signals 570*a*, 570*b* pass through signal attenuators 543 and 545, respectively, which couple portions of the downlink signals 570*a*, 570*b* to the downlink frequency conversion module 522. Similarly to the low-band MIMO signals, the downlink frequency conversion module 522 provides the M1 downlink signal 570*a* to the band combining module 526 relatively unaltered or unshifted or at an original frequency. However, to preserve the information contained in the M2 downlink signal 570*b*, the M2 downlink signal 570*b* is frequency shifted by a shift frequency amount SF2, so that the M2 downlink signal 570*b is shifted from an original frequency to a different frequency such as into a fourteenth frequency band FB14. The M1 and shifted M2 downlink signals 570***a*, 570*b are provided to the downlink band combining module 526** where they are combined with other downlink signals.

The MM-UMTS signal from the mid-band legacy BTS 493 is a non-MIMO signal, such as a SISO signal, and is coupled to the master unit 502 by duplexer 572, which separate the MM-UMTS signal into an uplink signal 574 and a downlink signal 576. The MM-UMTS downlink signal 576 passes through signal attenuator 544, which couples a portion of the downlink signal 576 to the downlink frequency conversion module 522. The downlink frequency conversion module 522 provides the MM-UMTS downlink signal 576 to the band combining module 526 relatively unaltered or unshifted or at the original frequency, where it is combined with other downlink signals.

The U-MIMO-1 (U1) and U-MIMO-2 (U2) signals from the upper-band BTS 494 are coupled to the master unit 502 by duplexers 578, 580, which separate the U-MIMO signals into uplink signals 582*a*, 582*b* and downlink signals 584*a*, 584*b*. The U1 and U2 downlink signals 584*a*, 584*b* pass through signal attenuators 546 and 547, respectively, which couple portions of the downlink signals 584*a*, 584*b* to the downlink frequency conversion module 522. Similarly to the low and mid-band MIMO signals, the downlink frequency conversion module 522 provides the U1 downlink signal 584*a* to the band combining module 526 relatively unaltered of unshifted or at an original frequency. However, to preserve the information contained in the U2 downlink signal 584*b*, the U2 downlink signal 584*b* is frequency shifted a shift frequency amount SF3, so that the shifted U2 downlink signal 584*b is shifted from an original frequency to a different frequency such as into a fifteenth frequency band FB15. The U1 and shifted U2 downlink signals 584***a*, 584*b are provided to the downlink band combining module 526 where they are combined with other downlink signals for transmission to the remote unit 506**.

In order to keep the MIMO channel signals for each MIMO band or MIMO set the master unit from interfering with each other, the master unit is operable to convert the various MIMO channel signals to different frequencies wherein the different frequency of one set of MIMO channel signals is different from the different frequency of another set of MIMO channel signals. For example, as discussed above, each of the FB13, FB14, and FB15 frequencies or frequency bands are different so that they may be transceived over the same fiber optic cable without interfering with each other.

The downlink band combining module 526 includes a low-band duplexer 586, and a high band duplexer 588. The low band duplexer 586 is coupled to L1 signal 556*a*, LL-GSM signal 560, frequency converted M2 signal 570*b, and frequency converted U2 signal 584*b. The aforementioned signals are thereby combined into a composite low band downlink signal 590 that includes signals in the fourteenth and fifteenth frequency bands FB14, FB15 as well as frequencies in about the 800 MHz and 900 MHz ranges. Similarly, the high band duplexer 588 is coupled to the frequency converted L2 signal 556*b, the MM-UMTS signal 576, and the U1 signal 584***a*. The aforementioned signals are thereby combined into a composite high band downlink signal 592 that includes signals in the thirteenth frequency band FB13 as well as frequencies in about the 2100 and 2600 MHz ranges. The remaining M1 signal 570*a* is passed through the band combining module relatively unaltered. The bands used for frequency shifting may be chosen so as to be close to existing service bands that are already being handled. That is one or more of the MIMO channel signals are converted to a different frequency that is close to the original frequency of the unshifted or original frequency of the MIMO or non-MIMO signals. In that way, the signals may be efficiently combined and separated at the remote and master units using appropriate band combining and band separating circuit components such as combiners and duplexers. For example, the frequency converted M2 and U2 signals are converted so as to be close to the L-band (800 MHz) and LL-Band (900 MHz). Alternatively, the shifted L2 signal is shifted so as to be close to the MM-band (2100 MHz) and U-band (2600 MHz). As such efficient use of components is provided.

The M1 downlink signal 570*a*, composite low-band downlink signal 590, and composite high-band downlink signal 592 are coupled to the optical module 504. The optical module 504 includes an appropriate electrical-to-optical circuit 594, an optical-to-electrical circuit 596, and a wavelength-division multiplexer 598. The wavelength-division multiplexer 598 couples the composite optical downlink signal having a first wavelength, or color onto the optical fiber 602 and extracts the composite uplink signal having a second wavelength, or color from the same optical fiber 602. The M1 and composite downlink signals 570*a*, 590, 592 are coupled to the input of electrical-to-optic circuit 594, which converts the signals into a composite downlink optical signal 600. The composite downlink optical signal 600 is coupled to the optical fiber 602, for transporting the composite downlink optical signal 600 to the remote unit 506.

Referring now to FIG. 15, the remote unit 506 is configured to receive and transmit optical signals over the optic fiber 602, convert between optical signals and electrical signals, and receive and transmit RF electrical signals via one or more extension units 510, 512, 514 and via one or more antennas 618. The remote unit 506 thereby provides wireless coverage to the extended service area. To this end, the remote unit 506 includes an optical module 604, a low-band downlink duplexer 606, a high-band downlink duplexer 608, power amplifiers 610-612, a post-amplification duplexer 614, an antenna feed duplexer 616, an antenna 618, and one or more extension ports 628.

The optical module 604 includes a wavelength-division multiplexer 620 that is coupled to an optical-to-electrical downlink receiver circuit 622 and an electrical-to-optical uplink transmitter circuit 624. The composite downlink optical signal 600 is coupled from the optic fiber 602 to the optical-to-electrical circuit 622 by the wavelength-division multiplexer 620. In turn, the optical-to-electrical circuit 622 converts the composite downlink optical signal 600 into a composite downlink electrical signal, thereby recovering the M1 signal 570a, low-band composite downlink signal 590, and high-band composite downlink signal 592.

The low-band and high-band composite downlink signals 590, 592 are coupled to the low-band and high-band downlink duplexers, 606, 608 respectively. In turn, the low-band downlink duplexer 606 separates the low-band composite downlink signal 590 into L1 signal 556a, LL-GSM signal 560, and a U/M-MIMO-2 composite signal 626 comprising the frequency shifted M2 and U2 signals 570b*, 584b*. Similarly, the high-band downlink duplexer 608 separates the high-band composite signal 592 into the frequency shifted L2 signal 556b*, MM-UMTS signal 576, and U1 signal 584a.

The LL-GSM signal 560, M1 signal 570a, and MM-UMTS signal 576 are coupled to power amplifiers 610, 611, and 612 respectively, which amplify the signals to a level suitable for providing wireless coverage. In turn, the resulting amplified signals are coupled to antenna 618 by the post-amplification and antenna duplexers 614, 616. The remote unit 506 thereby provides wireless coverage to the extended service area by extending the coverage of the low-band and mid-band legacy BTSs 491, 493. The remote unit 506 also extends the service area for the M1 signal 570a.

In the specific embodiment illustrated in FIG. 15, the remaining L1 signal 556a, frequency shifted L2 signal 556b*, U1 signal 584a, and U/M-MIMO-2 composite signal 626 are coupled to an appropriate filter unit 508 through the extension port 628, which is coupled to an input port 630 of the filter unit 508 via suitable transmission lines. However, it should be understood that in alternative embodiments, a suitably configured extension unit may be coupled directly to the extension port 628, in which case the filter unit 508 would be omitted. In the embodiment illustrated in FIG. 15, the filter unit 508 includes, in addition to the input port 630, three output ports 632-634 and a duplexer 636 that separates the frequency shifted M2 and U2 signals 570b*, 584b*. The filter unit 508 is thereby configured so that:

(1) the L1 and frequency shifted L2 signals 556a, 556b* are coupled to the first filter unit output port 632, which in turn is coupled to the first extension unit 510;

(2) the frequency shifted M2 signal 570b* is coupled to the second filter unit output port 633, which in turn is coupled to the second extension unit 512; and (3) the U1 and frequency shifted U2 signals 584a, 584b* are coupled to the third filter unit output port 634, which in turn is coupled to the third extension unit 514.

The first extension unit 510 includes a frequency conversion circuit 638, transmit/receive duplexers 640, 642, power amplifiers 644, 646 and antennas 648, 650. The frequency shifted L2 signal 556b* is coupled to the input of the frequency conversion circuit 638, which shifts the signal by the first shift frequency amount SF1 so that the frequency range of the L2 signal 556b is restored to the same frequency range as the original L1 signal 556a for the air interface. The L1 and restored L2 signals 556a, 556b are coupled to the inputs of appropriate power amplifiers 644, 646, which in turn amplify the signals to a power level sufficient to cover the extended service area. The outputs of the power amplifiers 644, 646 are coupled to antennas 648, 650 by the transmit/receive duplexers 640, 642. The first extension unit 510 thereby extends the coverage of the low-band BTS 490 into the service area.

The second extension unit 512 includes a frequency conversion circuit 652, a transmit/receive duplexer 654, a power amplifier 656, and an antenna 658. The frequency shifted M2 signal 570b* is coupled to the input of the frequency conversion circuit 652, which shifts the signal by the second shift frequency amount SF2 so that the frequency range of the M2 signal 570b is restored to the same frequency range as the original M1 signal 570a. The restored M2 signal 570b is coupled to the input of power amplifier 656, which in turn amplifies the signal to a power level sufficient to cover the extended service area. The output of the power amplifier 656 is coupled antenna 658 by the transmit/receive duplexer 654. The second extension unit 512, working in cooperation with the remote unit 506 (which transmits the M1 signal 570a) thereby extends the coverage of the mid-band BTS 492 into the service area.

The third extension unit 514 includes a frequency conversion circuit 660, transmit/receive duplexers 662, 664, power amplifiers 666, 668 and antennas 670, 672. The frequency shifted U2 signal 584b* is coupled to the input of the frequency conversion circuit 660, which shifts the signal by the third shift frequency amount SF3 so that the frequency range of the U2 signal 584b is restored to the same frequency range (2620-2690 MHz) as the U1 signal 584a. The U1 and restored U2 signals 584a, 584b are coupled to the inputs of power amplifiers 666 and 668, which in turn amplify the signals to a power level sufficient to cover the extended service area. The outputs of the power amplifiers 666, 668 are coupled to antennas 670, 672 by the transmit/receive duplexers 662, 664. The third extension unit 512 thereby extends the coverage of the upper-band BTS 494 into the service area.

The frequency conversion circuits 638, 652, 660 in the extension units 510, 512, 514 may include local oscillators, mixers, and filters as is known in the art. To synchronize the local oscillators in the extension units 510, 512, 514 with the local oscillators in the frequency conversion modules 520, 522 in the master unit 502, the frequency conversion circuits 638, 652, 660 may receive a common reference signal transmitted via the same downlink path as the BTS signals. This common reference signal transmitted from the master unit to the remote unit and to the filter unit and all extension units may be used to synchronize the offset frequencies of the frequency conversion circuits 638, 652, 660 with their associated frequency conversion circuits in the frequency conversion module 522 and to frequency lock all of the frequency synthesizers used for frequency conversion. The common reference signal or signals may thereby allow the frequency converted signals to be recovered to their original frequency with minimal error. In an alternative embodiment, high stability reference sources may be used in the conversion modules 520, 522 and extension units 510, 512, 514 to provide frequency matching between the conversion stages.

The invention in its broader aspects is not limited to the specific details representative apparatus and method, and illustrative examples shown and described. Accordingly, departures may be made from such details without departure from the spirit or scope of the applicants' general inventive concept. For example, embodiments of the invention may shift or convert frequencies by either downconverting or upconverting the frequency. Thus, in a downlink direction, at least one MIMO signal received by a master unit may be upconverted before such signal is passed over an optical link to a remote unit and/or extension unit. This upconverted signal may then be downconverted to the appropriate MIMO band by the remote unit and/or extension unit before it is transmitted. Alternative embodiments of the invention may, instead, downconvert at least one signal received by the master unit before such signal is passed over an optical link to the remote unit and/or extension unit, then upconvert that signal to the MIMO band at the remote unit and/or extension unit. Therefore, the direction of the frequency conversion is not limiting, as described herein, for the exemplary embodiments. Correspondingly, in an uplink direction, at least one signal received by the remote unit and/or extension unit may be upconverted before such signal is passed over an optical ink to the master unit. This upconverted signal may then downconverted to the MIMO band by the master unit before it is transmitted back to a BTS. Alternative embodiments of the invention may, instead, downconvert at least one signal received by the remote unit and/or extension unit before such signal is passed over an optical link to the master unit, then upconvert that signal at the master unit to the appropriate MIMO band.

Moreover, the DAS systems of FIGS. 2A-2B, 3A-3B, 4A-4C, 6A-6B, and 7A-7B, and the components or circuits or FIGS. 5 and 8-15 may include more or fewer components consistent with embodiments of the invention. In particular, each master unit 46 of a MIMO DAS system may communicate with more than three sets of remote units and receive more signals than those shown or described. Such a master unit 46 can support up to 124 remote units in point to point architecture and or up to 31 optical links in cascaded architecture with up to 4 remote units per optical link in one embodiment of the invention. As such, the systems of FIGS. 2A-2B, 3A-3B, 4A-4C, 6A-6B, and 7A-7B may be configured with more or fewer master units, remote units, extension units, or other components consistent with embodiments of the invention.

Other modifications will be apparent to one of ordinary skill in the art. Therefore, the invention lies in the claims hereinafter appended.

What is claimed is:

1. A method comprising:

receiving at least one set of multiple input multiple output (MIMO) channel signals at an original MIMO frequency from at least one signal source at a master unit of a distributed antenna system, at least one set of the MIMO channel signals including at least a first MIMO channel signal and a second MIMO channel signal;

generating a local oscillator signal at the master unit;

frequency converting the at least one of the first MIMO channel signal and the second MIMO channel signal from an original MIMO frequency to a different frequency different from a first legacy service frequency band using the local oscillator signal at the master unit;

receiving at least one non-MIMO signal that has a frequency in the first legacy service band at the master unit;

processing the at least one converted MIMO channel signal and the at least one non-MIMO signal at the master unit;

combining the at least one non-MIMO signal in the first legacy frequency band along with the first MIMO channel signal, the second MIMO channel signal, and the local oscillator signal into a combined signal at the master unit;

transmitting the combined signal across an optical link to a remote unit;

processing together the at least one non-MIMO signal in the first legacy service frequency band and the at least one of the first MIMO channel signal and the second MIMO channel signal at the remote unit; and frequency converting the at least one converted MIMO channel signal from the different frequency different from the first legacy service frequency band back to the original MIMO frequency for transmission over at least one antenna.

2. The method of claim 1, comprising:

receiving the local oscillator signal from the remote unit at conversion circuitry; and using the local oscillator signal to frequency convert the at least one of the first MIMO channel signal and the second MIMO channel signal from the different frequency different from the first legacy service frequency band back to the original MIMO frequency.

3. The method of claim 1, comprising:

using the local oscillator signal to generate other frequency signals for use in converting at least a second one of the first MIMO channel signal and the second MIMO channel signal to another different frequency different from the first legacy service frequency band from the original MIMO frequency.

4. The method of claim 1, comprising:

frequency converting both the first MIMO channel signal and the second MIMO channel signal to different frequencies at the master unit; and frequency converting the first MIMO channel signal to a frequency that is different from a frequency of the second MIMO channel signal at the master unit.

5. The method of claim 4, comprising:

frequency converting all of the MIMO channel signals back to the original MIMO frequency for transmission over the at least one antenna.

6. The method of claim 1, comprising:

transceiving both uplink signals and downlink signals between the remote unit and the master unit across at least one fiber-optic cable.

7. The method of claim 1, wherein frequency converting the at least one converted MIMO channel signal from the different frequency different from the first legacy service frequency band back to the original MIMO frequency occurs at the at least one remote unit.

8. The method of claim 1, wherein frequency converting the at least one converted MIMO channel signal from the different frequency different from the first legacy service frequency band back to the original MIMO frequency occurs at least one extension unit in communication with the at least one remote unit.

9. The method of claim 1, further comprising:

wherein the first legacy service frequency band is lower in frequency than the original MIMO frequency of the at least one set of MIMO channel signals; and frequency converting the at least one of the first MIMO channel signal and the second MIMO channel signal from the original MIMO frequency to a lower different frequency that is different from the first legacy service frequency band at the master unit.

10. The method of claim 1, further comprising:

wherein the first legacy service frequency band is higher in frequency than the original MIMO frequency of the at least one set of MIMO channel signals; and frequency converting the at least one of the first MIMO channel signal and the second MIMO channel signal from the original MIMO frequency to a higher different frequency that is different from the first legacy service frequency band at the master unit.

11. The method of claim 1, further comprising:

receiving at least one additional set of MIMO channel signals at another original MIMO frequency different from the original MIMO frequency of the at least one set of MIMO signals at the master unit;

frequency converting at least one of the first and second MIMO channel signals of the additional set of MIMO channel signals to another different frequency different from the first legacy service frequency band from the another original MIMO frequency at the master unit; and combining the at least one additional set of MIMO channel signals for transmission at the master unit.

12. The method of claim 1, further comprising:

frequency converting the at least one of the first and the second converted MIMO channel signals of the at least one additional set from the frequency different from the first legacy service frequency band back to the another original MIMO frequency for transmission over the at least one antenna at a plurality of extension units coupled to at least one remote unit.

13. The method of claim 1, further comprising:

frequency converting the at least one of the first MIMO channel signal and the second MIMO channel signal of the additional set of MIMO channel signals to another different frequency that is different from the original MIMO frequency of the at least one set of MIMO channel signals at the master unit; and combining the at least one set of MIMO channel signals for transmission at the master unit.

14. The method of claim 1, further comprising:

wherein at least one of the first MIMO channel signal and the second MIMO channel signal is maintained at the original MIMO frequency; and transmitting at least one of the first MIMO channel signal and the second MIMO channel signal at the original MIMO frequency over the at least one antenna at the remote unit.

15. A method comprising:

receiving a plurality of sets of multiple input multiple output (MIMO) channel signals at respective original first and second MIMO frequencies at a master unit of a distributed antenna system, each set of the MIMO channel signals including at least a first MIMO channel signal and a second MIMO channel signal;

generating a local oscillator signal at the master unit;

frequency converting the at least one of the first MIMO channel signals from the original first MIMO frequency to a first different frequency different from a first legacy service frequency band using the local oscillator signal at the master unit;

frequency converting the at least one of the second MIMO channel signals from the original second MIMO frequency to a second different frequency different from a second legacy service frequency band based on the local oscillator signal at the master unit;

receiving a plurality of non-MIMO signals that have original frequencies in at least the first legacy service frequency band and the second legacy service frequency band at the master unit;

processing the plurality of non-MIMO signals using the band processing circuit component at the master unit;

combining the plurality of non-MIMO signals in the at least the first legacy service frequency band and the second legacy service frequency band along with the at least one of the first MIMO channel signals, the at least one of the second MIMO channel signals, and the local oscillator signal at the master unit into a combined signal at the master unit;

transmitting the combined signal across an optical link to a remote unit;

processing together the plurality of non-MIMO signals in the at least the first legacy frequency band and the at least one converted first MIMO channel signal at the remote unit;

processing together the plurality of non-MIMO signals in the at least the second legacy service frequency band and the at least one converted second MIMO channel signal at the remote unit;

frequency converting the at least one converted first MIMO channel signal from the first different frequency different from the first legacy service frequency band and back to the first MIMO frequency for transmission over the at least one antenna; and frequency converting the at least one converted second MIMO channel signal from the second different frequency different from the second legacy service frequency band and back to the second MIMO frequency for transmission over at least one antenna.

16. The method of claim 15, further comprising:

receiving the local oscillator signal from the remote unit; and using the local oscillator signal to frequency convert the at least one converted first MIMO channel signal from the first different frequency different from the first legacy service frequency band and back to the first MIMO frequency for transmission over the at least one antenna.

17. The method of claim 15, further comprising:

using the local oscillator signal to generate a second local oscillator signal for use in converting the original second MIMO frequency to the second different frequency different from the second legacy service frequency band at the master unit.

18. The method of claim 17, further comprising:

receiving the at least one local oscillator signal from the remote unit;

using the local oscillator signal to frequency convert the at least one converted first MIMO channel signal from the first different frequency different from the first legacy service frequency band and back to the first MIMO frequency for transmission over the at least one antenna;

using the second local oscillator signal to frequency convert the at least one converted second MIMO channel signal from the second different frequency different from the second legacy service frequency band and back to the second MIMO frequency for transmission over the at least one antenna.

* * * * *